(12) United States Patent
Glass et al.

(10) Patent No.: US 6,278,965 B1
(45) Date of Patent: Aug. 21, 2001

(54) REAL-TIME SURFACE TRAFFIC ADVISER

(75) Inventors: Brian J. Glass, Palo Alto; Liljana Spirkovska, Sunnyvale; William J. McDermott, Menlo Park; Ronald J. Reisman, Palo Alto; James Gibson, Campbell; David L. Iverson, Sunnyvale, all of CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/131,560

(22) Filed: Aug. 10, 1998

Related U.S. Application Data

(63) Continuation-in-part of application No. 09/090,812, filed on Jun. 4, 1998, now Pat. No. 6,161,097.

(51) Int. Cl.[7] .............................. G06F 163/00; G06F 7/00; G06F 7/06; G06F 17/40
(52) U.S. Cl. ................................ 703/22; 703/8; 701/120; 705/6
(58) Field of Search .................................... 701/1, 15, 16, 701/117, 120, 204, 300, 301; 703/2, 8, 22

(56) References Cited

U.S. PATENT DOCUMENTS

| | | |
|---|---|---|
| 4,979,137 | 12/1990 | Gerstenfeld et al. . |
| 5,216,611 | 6/1993 | McElreath . |
| 5,574,648 | 11/1996 | Pilley . |
| 5,623,413 | 4/1997 | Matheson et al. . |
| 5,670,961 | 9/1997 | Tomita et al. . |
| 5,740,047 | 4/1998 | Pilley et al. . |
| 5,913,912 * | 6/1999 | Mishimura et al. .................... 701/35 |
| 6,006,158 * | 12/1999 | Pilley et al. .......................... 701/120 |

OTHER PUBLICATIONS

Winter, H. and NuBer, H.–G. (Editors) "Advanced Technologies for Air Traffic Flow Management", Proceedings of an International Seminar Organized by Deutsche Forschungsanstalt fur Luft–und Raumfahrt (DLR), Bonn, Germany, Apr. 1994.

Meuninck, T.C., titled "Finding the Pulse of the ATC System Heartbeat: A Joint Atlanta Airport/Local FAA/Aviation Users Adventure", Journal of ATC, Jan.–Mar. 1995, pp. 28, 29.

Talley, R.G. and Cistone, J.A., "ASTA Traffic Planner System Description", Report 4J50–AHD–D001, Martin Marietta Corporation, Management and Data Systems, Dec. 1993.

Davis, T.J., Krzeczowski, K.J., and Bergh, C., "The Final Approach Spacing Tool," 13th IFAC Symposium on Automatic Control in Aerospace, Palo Alto, CA, Sep. 1994.

Skaliotis, G. J., "An Independent Survey of AMASS/ASTA Benefits," Report RSPA/VNTSC–FA2P8–PM1, Surveillance and Sensors Division, Volpe National Transportation Systems Center, Cambridge, MA, Dec. 1991.

* cited by examiner

*Primary Examiner*—Kevin J. Teska
*Assistant Examiner*—Lonnie A. Knox
(74) *Attorney, Agent, or Firm*—Carla M. Wong; Robert M. Padilla

(57) ABSTRACT

A real-time data management system which uses data generated at different rates, by multiple heterogeneous incompatible data sources. In one embodiment, the invention is as an airport surface traffic data management system (traffic adviser) that electronically interconnects air traffic control, airline, and airport operations user communities to facilitate information sharing and improve taxi queuing. The system uses an expert system to fuse data from a variety of airline, airport operations, ramp control, and air traffic control sources, in order to establish, predict, and update reference data values for every aircraft surface operation.

8 Claims, 10 Drawing Sheets

REAL-TIME SURFACE TRAFFIC ADVISER

This application is a continuation-in-part of application(s) application Ser. No. 09/090,812 filed on Jun. 4, 1998 now U.S. Pat. No. 6,161,097.

The invention described herein was made by employees of the United States government in the performance of work under contracts from the United States Federal Aviation Administration (FAA) and the United States National Aeronautics & Space Administration (NASA) and is subject to the provision of Section 305 of the United States National Aeronautics and Space Act of 1958, Public Law 85–568 (72 Stat. 435; 42 U.S.C. 2457). The present invention may be manufactured and used by or for the United States Government for governmental purposes without payment of any royalties thereon or therefor.

BACKGROUND OF THE INVENTION

The present invention, developed during a joint research effort by FAA and NASA, relates to surface traffic management and the tracking, movement, and scheduling of multiple vehicles.

There is an ongoing, critical need for adequate surface traffic management to deal with increasing densities of road, water, air, and other surface traffic. Increased efforts by the research community are being made to cope with this accelerating challenge.

Airports are a critical venue for enhanced surface traffic management. Costs in departure taxi delays are $1.6 billion dollars a year in the U.S. alone. A number of airports face potential gridlock in the near future, in part due to these inefficiencies.

Various systems have been developed to improve information gathering, sharing, prediction, and use, in order to improve airport surface traffic management. These systems are a means to improve airport throughput and reduce the losses caused by inefficient taxi and runway queuing.

Surface traffic control systems in airports involve physical tracking of the aircraft. The systems use satellite tracking, surface radar tracking, infra-red tracking, diffusion field tracking, and other similar methods. Using such direct tracking methods, innovators have taught ways of identifying an aircraft's whereabouts after it has landed and before it has reached the gate, and after it has pushed back from the gate and before radar acquisition shortly after takeoff.

Tomita et al. (U.S. Pat. No. 5,670,961, issued Sep. 23, 1997) teach an airport surface traffic system which detects moving targets on an airport surface and automatically address identification codes to assist ground controllers and increase safety. This system incorporates some previously published flight schedule data. The Tomita et al. system is dependent on the presence of ground radar for surface tracking of aircraft.

Pilley et al. (U.S. Pat. No. 5,740,047, issued Apr. 14, 1998) disclose a GNSS (global navigational satellite system) multi-dimensional (3-D mapping plus time) management system used both for in-flight and surface aircraft control. The lynchpin of the system is the satellite-based location of aircraft, which allows for a zone-based incursion, alert, control, and scheduling system.

While the systems of Tomita et al. and Pilley et al., as well as other similar systems, are useful in helping with ground traffic management, airports still have a need for a system that provides real-time data acquisition and fusion from existing information sources and a taxiing efficiency predictive component. In response to this need, it has been suggested by a number of industry researchers that systems be developed that are not dependent on the deployment of additional tracking equipment.

Talley et al. (ASTA Traffic Planner System Description, Report 4J50-AHD-D001, Martin Marietta Corporation, Management and Data Systems, December 1993) describe proposed systems requirements for the ATP (ASTA Traffic Planner), an ASTA (Airport Surface Traffic Automation) system. Developing the capability to collect, integrate, and use different types of data from different domains of control is proposed. Methods for data acquisition, fusion, and prediction are not provided.

T. C. Meuninck reported a simple point-to-point data exchange test conducted at the Atlanta Airport wherein radar data was provided to the tower controllers. ("Finding the Pulse of the ATC System Heartbeat: A Joint Atlanta Airport/Local FAA/Aviation Users Adventure," Journal of ATC, January–March 1995, pp. 28–29.) Meunick's test suggested the potential workability of a data acquisition and fusion system. Additional work in surface taxi route planning has been developed and tested in Europe. The German TARMAC-PL system (Taxi and Ramp Management and Control—Planning), for example, uses a unified gate-to-takeoff taxi planning and route generation approach. (Winter, H. and Nüsser, H.-G., Eds., *Advanced Technologies for Air Traffic Flow Management*, Bonn, Germany, April 1994, pp. 191–224. See also Klein, K., "Taxi and Ramp Management and Control," Institute of Flight Guidance, Internet: http:www.bs.dir.de/ff/fl/25/tarmac.htm, last modified Jun. 10, 1997, printed on Aug. 7, 1998.)

TARMAC may be the most mature and useful surface routing system currently in use. However, it would have limited application at U.S. and certain other airports. For instance, TARMAC is dependent on a variety of sensors that track actual ground aircraft position. Such sensors are generally lacking in U.S. and certain other airports. Also, TARMAC is functionally dependent on a level of communication and cooperation between different domains of control not found in the United States or in many other non-European countries.

TARMAC also has other limitations. For instance, it does not have a predictive element for on-ground aircraft location. Rather, TARMAC's predictive focus is on the shortest and most efficient taxi route from landing to takeoff.

The TMS system, a product of The Preston Group of Australia, also assists with surface route planning. ("TAAM Capabilities and Applications Overview Released," http://www.bs.dlr.de/ff/fl/25/tarmac.htm, last updated Jan. 1997, printed Aug. 7, 1998.) TMS uses software modeling to optimize the allocation of airport facilities and equipment such as aircraft stands, check-in desks, gate lounges, etc. SAIGA, a similar system developed in conjunction with ILOG SA, is a gate, stand, and belt allocation system. (Berger, R., "Constraint-Based Gate Allocation for Airports." http://www.ilog.com/papers/optimization/soluc32.pdf, last updated Sep. 26, 1997, printed Aug. 7, 1998.)

While considerable advancement has been made in surface traffic control over the last decade, the systems currently in use cannot be practically applied in United States and other airports having either minimal actual aircraft surface tracking data or a lack of communication and cooperation between different domains of control. The most mature of these systems are proprietary and therefore difficult to evaluate.

A system that predicts the locations, optimal taxiing, and departure queuing of on-the-ground aircraft by accessing, interpreting, and interpolating disparate existing data would be an important advancement in surface traffic management.

BRIEF SUMMARY OF THE INVENTION

The inventive traffic advisor for the first time allows ground traffic optimization using incompatible heterogeneous data sources in concert with a predictive capability. The inventive advisor has particular application to airport ground traffic management. It is the first ground traffic management system of practical application for use at US and other airports that lack detectors for tracking actual ground aircraft movement. The inventive adviser enables proactive management and planning of airline and airport resources and provides for more accurate information to airport personnel and even passengers.

A special feature of the subject invention is that it allows air traffic controllers to efficiently balance takeoff queues and minimize taxi and waiting time. This increased efficiency allows higher traffic throughput at airports without the considerable expense of undertaking physical improvements. This feature of the present invention is particularly critical in high density metropolitan areas where airfield expansion is not possible. The inventive adviser also allows high quality training of tower ground control personnel. In addition to assisting ground controllers, the inventive adviser also optimizes the activities and functions of airport employees, as well as airline personnel. The activities of these additional employees include baggage management, aircraft fueling and servicing, ramp and stand allocation, etc.

It is an object of the present invention to provide a surface traffic data management and prediction system for scheduling the movement of multiple vehicles such as aircraft, marine vessels, rail vehicles, etc.

It is another object of the present invention to provide airport ground traffic optimization through a system that maximizes the amount of information available to ground traffic controllers through acquisition, fusion, and predictive use of data generated at different rates by multiple heterogeneous incompatible data sources.

It is yet another object of the present invention to provide an inherently modular and expandable system allowing additional sources of real-time or published input data.

It is a further object of the present invention to provide education and training through the simulation of archived airport surface traffic scenarios.

It is still another object of the present invention to improve airport ground traffic and in-flight safety through the optimization of surface traffic management, the creation of contingency simulations and training scenarios, and the rapid rerouting of surface traffic in case of actual emergencies.

The first working prototype of the inventive traffic adviser has proven this system's extraordinary usefulness in airport surface traffic management and its ability to effect dramatic cost savings. Test data collected over several months at the Atlanta, Georgia, airport in the United States demonstrated that one embodiment of the invention improved departure taxi times by roughly one minute per aircraft. At $40/minute direct costs, the traffic adviser would provide savings of at least $12 million U.S. dollars per year for the airlines at the Atlanta airport alone.

Some of the advantages of the inventive traffic adviser that contributed to the important time savings achieved by the prototype embodiment are:

1. The traffic adviser allows FAA tower management to optimize the airport departure configuration ("departure split") for actual departure demand, without relying on published schedules.

2. Improved management of gates, servicing equipment, ground crews, etc., from knowledge of arriving aircraft locations and time-to-gate estimates.

3. Enhanced safety through improved airfield-wide situational awareness.

4. High-speed data connections between all airport operations users improves overall airport coordination.

5. Automatic archiving of past days operations, via an information system database.

6. Electronic displays of flight data replace inefficient methods such as paper notes, grease pencil drafting, etc.

The traffic adviser may be used as a training tool for improving the situational awareness of the participants in airfield surface operations, such as FAA tower controllers, ramp and airport operators, and commercial airline employees. Better informed air traffic, airline, and airport operations users make more optimal decisions improving overall airport throughput and safety. This reduces time losses caused by inefficient taxi and runway queuing, and establishes and updates reference data values for every aircraft surface operation.

In one embodiment of the present invention, the traffic adviser includes an automated data exchange and fusion system that assists in the optimization of airport surface traffic management, and electronically connects the air traffic control, airline, and airport operations user communities. This inventive feature facilitates information sharing and improved taxi queuing. The traffic adviser uses a computerized expert system to fuse data from a variety of airline, airport operations, ramp control, and air traffic control tower sources, in order to establish and update reference data values for every aircraft surface operation.

In another preferred embodiment, the traffic adviser is a client-server system that trades real-time aircraft operations data between the FAA, various airlines, the city Department of Aviation (airport management), and the ramp controllers. In addition to improving the level of coordination between these groups, the traffic adviser generates its own value-added data products, such as estimated at-gate aircraft arrival times and estimated aircraft departure times. These value-added data products enable tower ground controllers to optimize departure configuration splits by balancing departure queues. In this way, taxiing and departure times are generally minimized, resulting in increased airport throughput and cost-savings.

In yet another preferred embodiment of the present inventive system, the flexibility of the traffic adviser allows for effective implementation with even a single data source input. The limited selection of sources can be tailored to a specific users' needs. In fact, a single user can have a tailored system which i s highly valuable to their particular activity.

Such a smaller, tailored system allows effective information gathering, fusion, prediction, and distribution on a precisely targeted basis. For instance, the inventive traffic advisor can provide airlines with information about in-flight arrival position and incipient landing times, resulting from a single data source, e.g., airport terminal radar. This single data source single, user embodiment of the present invention can significantly increase the operational efficiency of an airport.

In an additional embodiment of the present invention, custom data management software is used rather than an expensive off-the-shelf database for the information management subsystem. This approach may optimize performance, and allows use of lower end, less expensive computers. This custom data management embodiment of the present invention is, for example, particularly suitable in small or low-financed airports where costs can make traffic management prohibitively expensive. The optimization of performance accrued by this embodiment may be preferable in other cases as well.

The inventive traffic adviser features innovative multiple interfaces that acquire data, a relational database on a central server, and a high-speed airport-area network using TCP/IP, Ethernet, and point-to-point protocols. Software subsystems are linked through the central database, and include data acquisition, database server, data fusion, prediction and monitoring, system execution and error reporting, and user interface functions.

The inventive traffic adviser is data-driven: messages or data updates are sent to various subsystems based on database table accesses or value changes. In one embodiment of the present invention, database size is modest (less than 3 GB) and contains an average of 15 days of airfield operations data. The previous days' data is averaged to provide default values when data is missing or deemed to be unreliable by the data fusion rules in the prediction subsystem. A software executive subsystem starts processes, monitors their health, recovers from faults or unexpected process terminations, and notifies the maintenance staff if an unrecoverable fault occurs.

The traffic adviser uses rules designed to accommodate a changing airport model and can derive useful information from less than ideal information flow. The traffic adviser incorporates heuristic assumptions for arrivals and departures to address conditions or other problems, including triggers and mitigation actions. In addition, it saves synthesized data in an archive for future use and analysis. Some of the saved synthesized data includes:

1. Flight history of items such as last radar position, arrival times, departure times, gate, and aircraft type.

2. Runway statistics (hourly, year to date, daily and monthly) of items such as airline and aircraft type.

3. Actual and planned departures times (quantitative time differences between information sources such as Flight Information Display System (FIDS) vs. pushback vs. wheels-up).

Information from the subject traffic adviser can be delivered to the user within the interface of some other air traffic automation system. This can be accomplished by many means including pop-up windows. The display could be triggered by an event-driven code or by an explicit graphical user interface function.

DETAILED DESCRIPTION OF THE INVENTION

Figure 1:
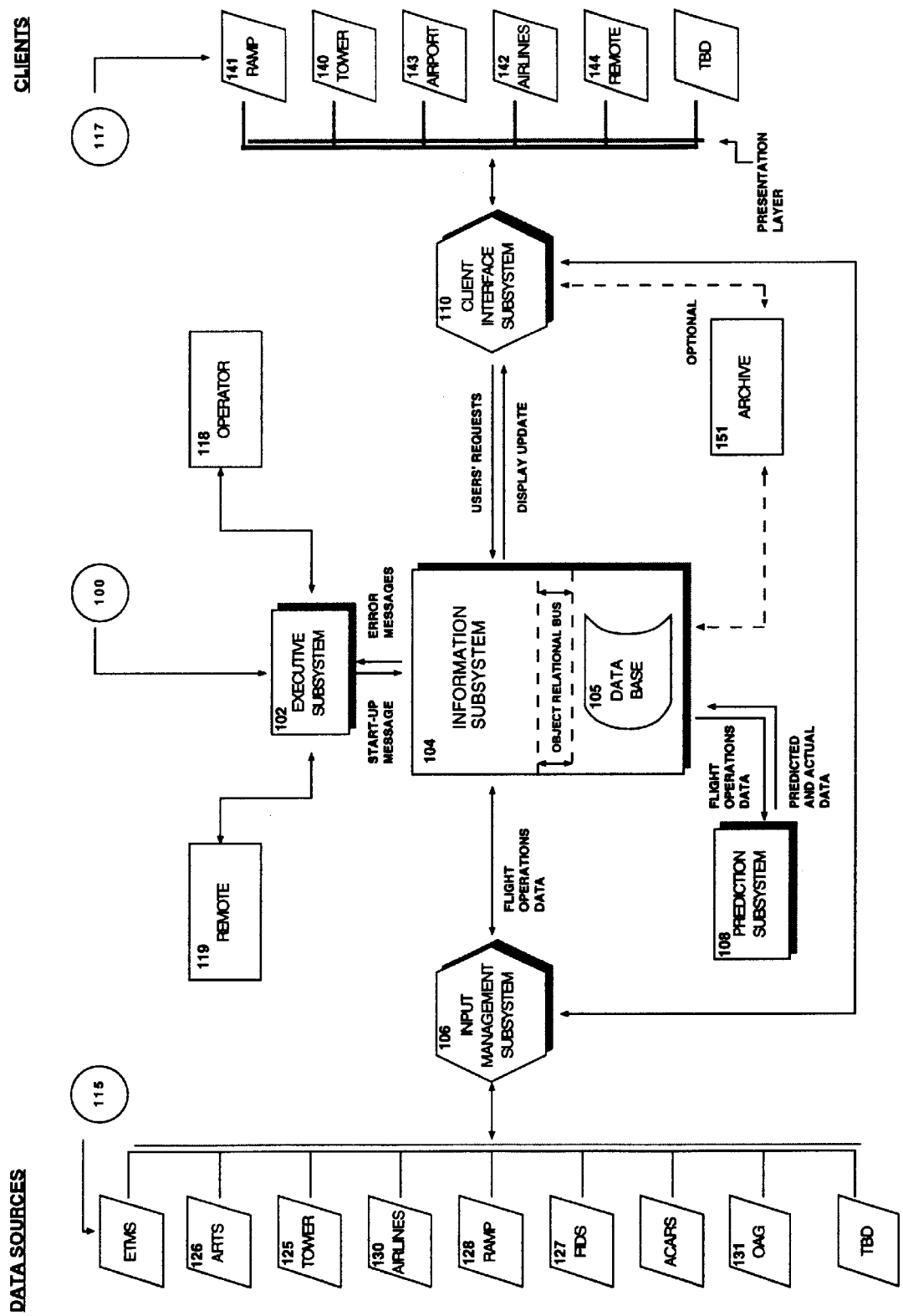
FIG. 1 is a functional flow chart illustrating the overall architecture of a traffic management system of the present invention.
Figure 2A:
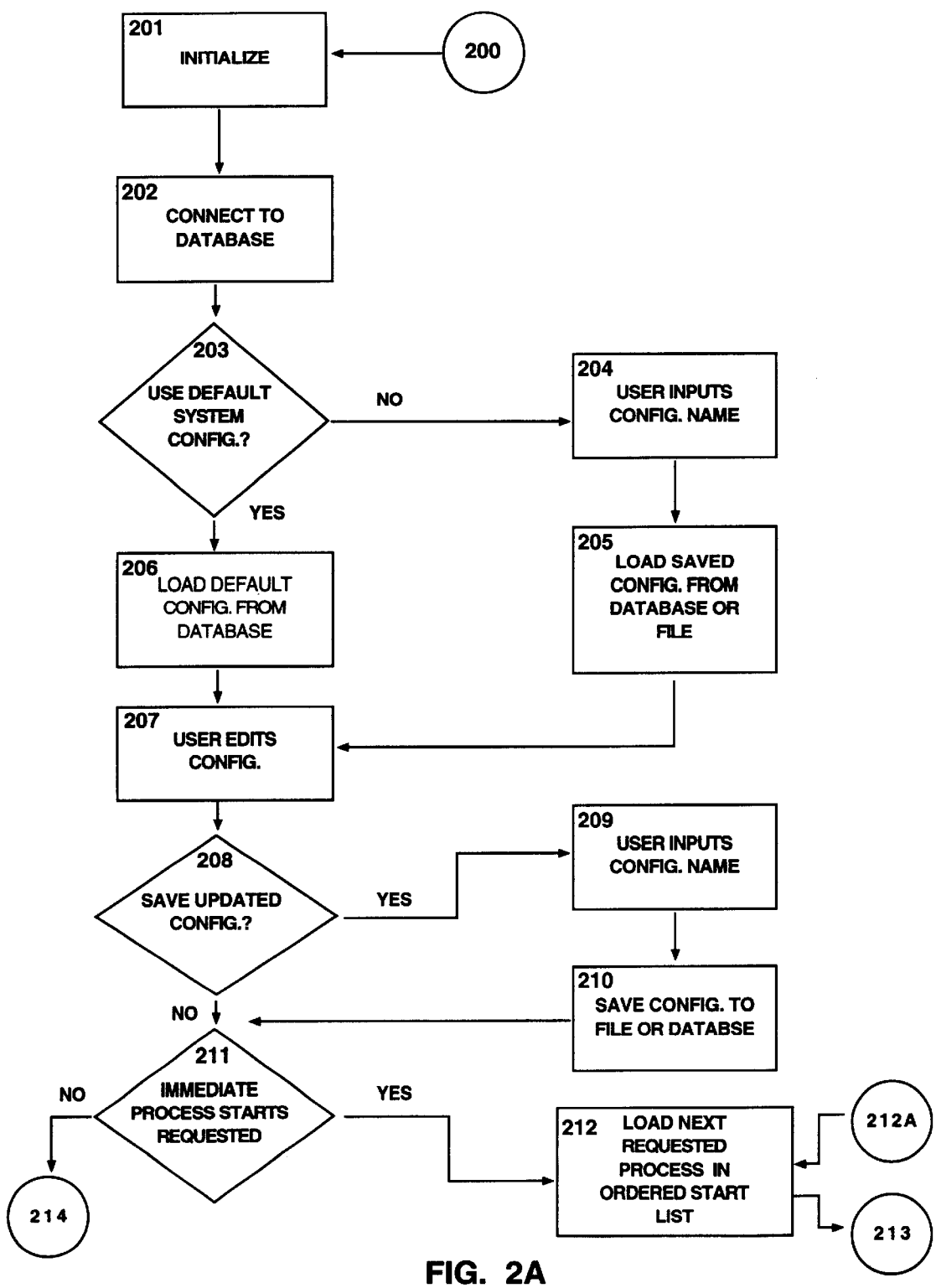
FIG. 2 comprises FIGS. 2A, 2B, 2C, and 2D, and represents a functional flow chart of an executive subsystem forming part of the traffic management system of FIG. 1.
Figure 2B:
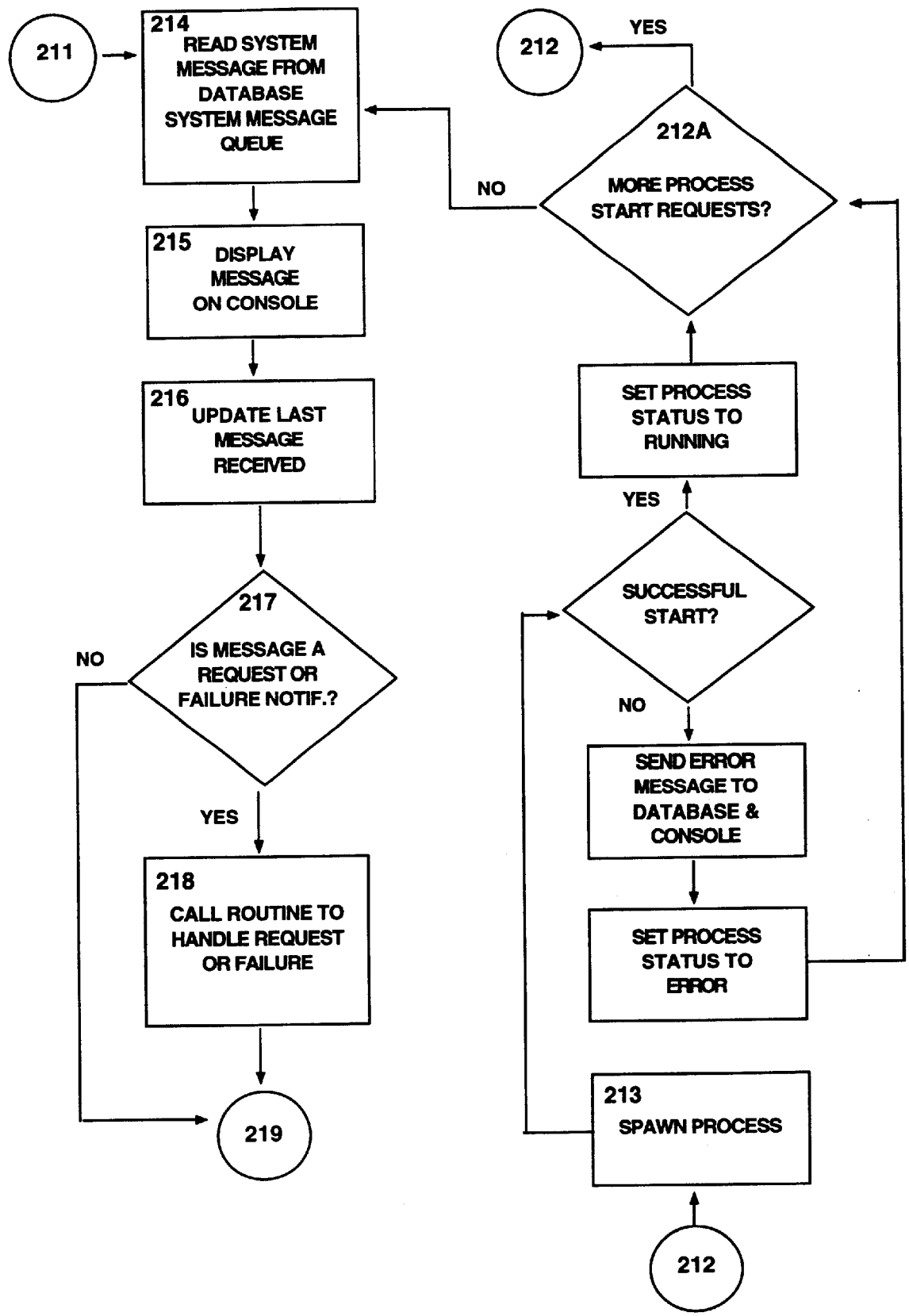
Figure 2C:
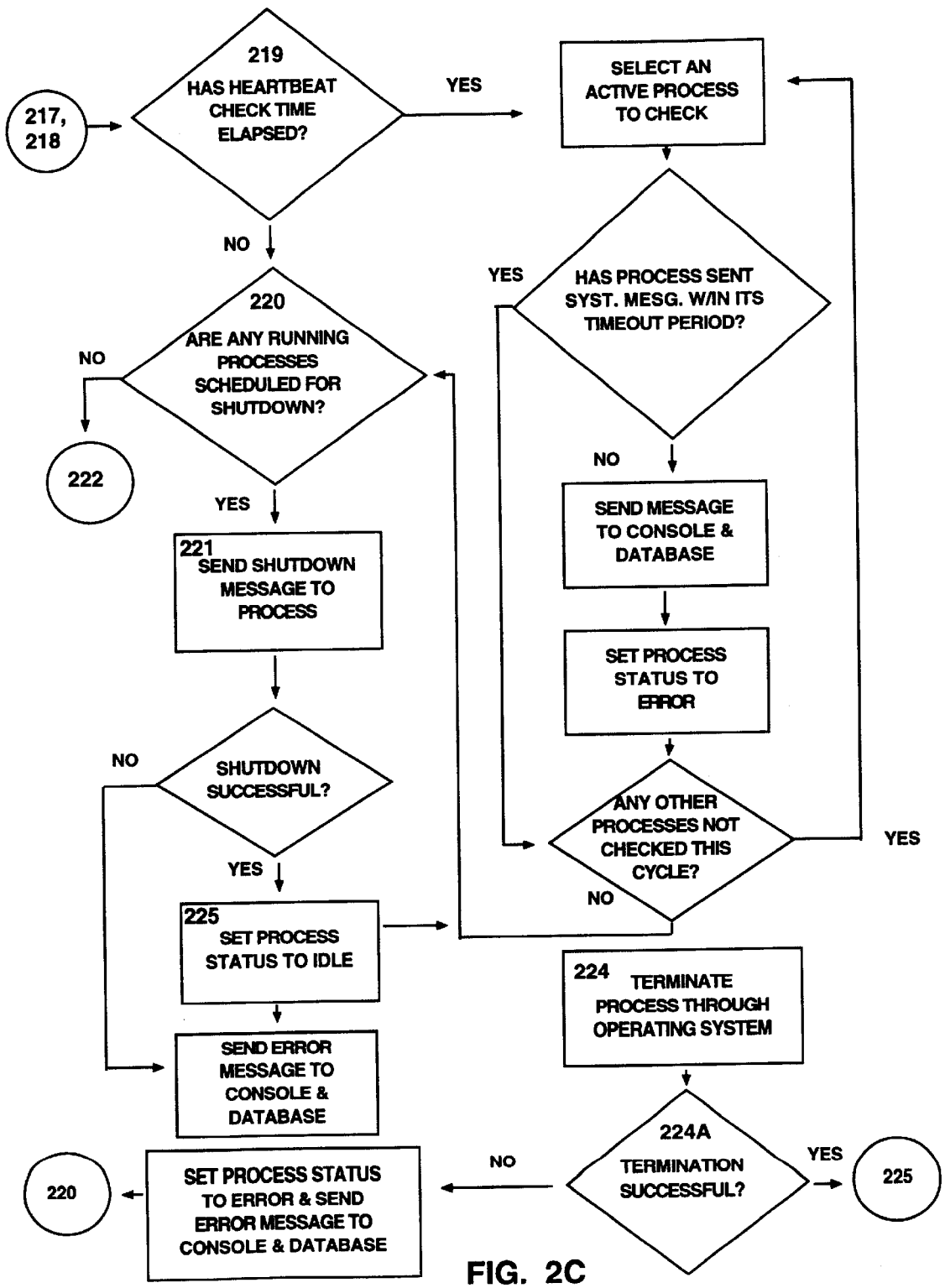
Figure 2D:
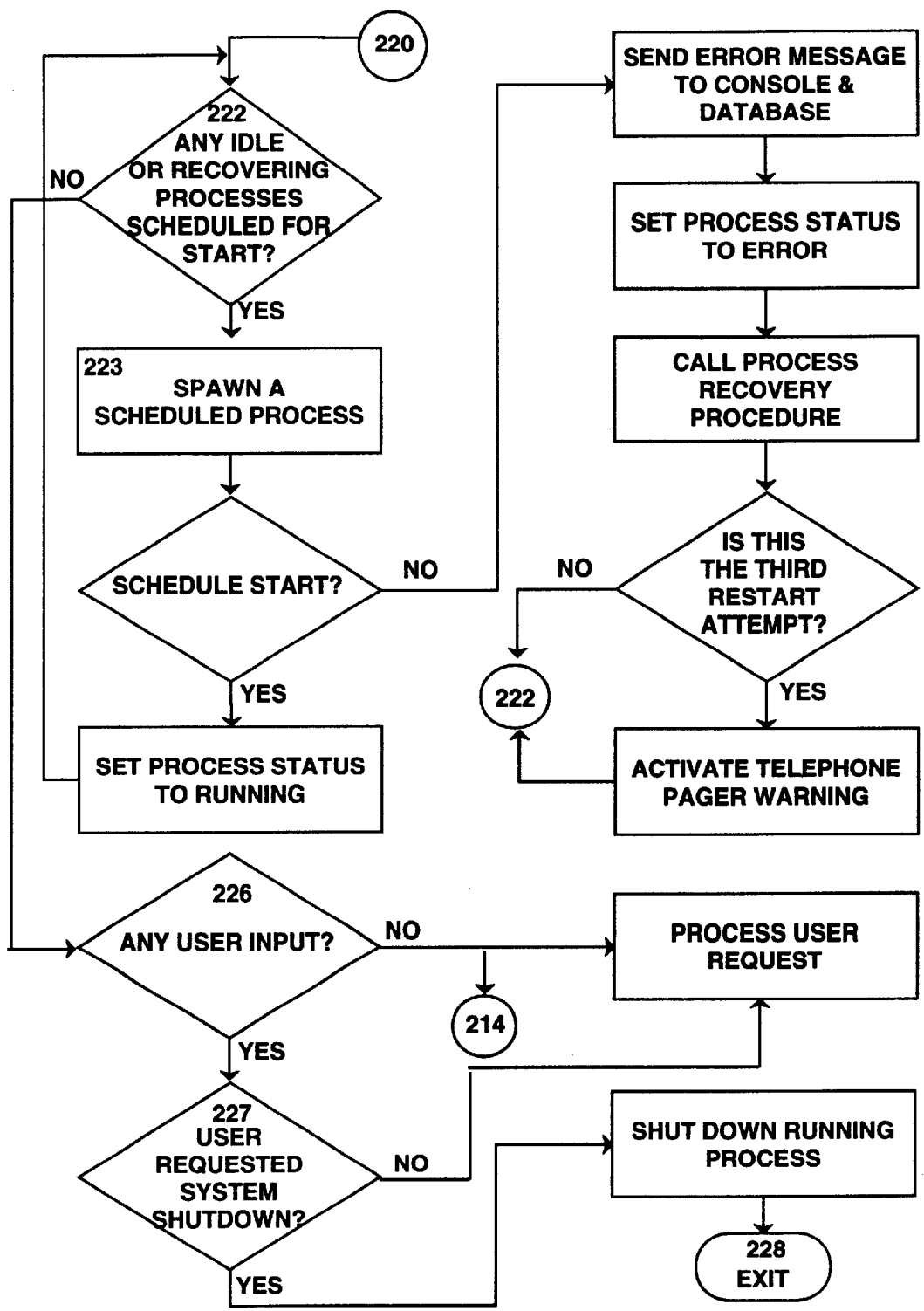

The inventive traffic advisor provides unique advantages over prior art systems and approaches. For instance, the inventive system allows, for the first time, ground traffic optimization using incompatible heterogeneous data sources. It also has a predictive and error correcting capability previously lacking in the art.

In the preferred embodiment of the inventive traffic advisor described in detail below in the example section of this application, the system is used to optimize airport ground traffic management. It is the first ground traffic management system of practical application for use at US and other airports that lack detectors for tracing actual ground aircraft movement.

The inventive traffic adviser enables proactive management and planning of airline and airport resources and provides for more accurate information to passengers and airport personnel as well. In practical examples described below the invention allowed substantial savings of time and money at the Atlanta airport. Another important advantage of the inventors' traffic adviser is its error correction and data-fill capability.

The many special features of the invention contribute both individually and as a synergistic whole to increased efficiency, improved safety, and more effective simulation and training.

Efficiency

Because of the rapidly developing gridlock facing major airports throughout the world, there are great concerns about the ability to sustain the increase in air traffic necessary to sustain the world economy. The present system described herein addresses this need by optimizing existing facilities and increasing their overall throughput without resorting to facility expansion. The inventors' system maximizes the efficiency and amplifies the planning capabilities of ground controllers, airline employees, and airport personnel.

Data-Sharing. A 1995 FAA study estimated that at congested hub airports the savings from an early embodiment of the subject invention due to its simple data-sharing feature alone would average one minute of taxi delay saved per flight operation. ("Cost-Benefit Analysis to add the SMA to the Tower Control Complex (TCCC) as a Planned Product Improvement," Tower Systems Engineering Group, AUA400/500, Federal Aviation Administration, Washington, D.C., December 1995.)

Other benefits of data sharing include better airport resource allocations. Currently, airlines and airport managers are typically unaware of the precise location of a given arriving or departing aircraft while it is in terminal area airspace (about a 60 nautical mile radius). As aircraft are moved into and out of holding patterns and sequenced for arrival, landing-time uncertainties of ±10 minutes are commonplace, which in turn adversely affect the efficient allocation of gates, servicing equipment, ground crews, etc. For instance, empty gates may be held for missing arrivals while early-arriving aircraft are left waiting for an available gate.

Predictive Capability. The inventive system's ability to make real-time access of a variety of heterogeneous, incompatible data-sources, in combination with its predictive component, provides an unprecedented increase in efficiency through its traffic allocation and management advisement capability. For example, for departing aircraft, FAA practice is usually to assign these aircraft to a departure runway based on the Standard Instrument Departure fix given in the flight plan. Overall airport departure configuration is defined as a "split" which divides the departure fixes among the departure runways. Each departing aircraft files a flight plan which references its assigned departure fix. Changing the current split therefore changes which departing aircraft are assigned to taxi to given runways.

Balancing the departure runway queues (in terms of equal wait times for the last aircraft in each queue) can be shown to generally minimize the departure bank's average taxi time. ("Cost-Benefit Analysis to add the SMA to the Tower Control Complex (TCCC) as a Planned Product Improvement," Tower Systems Engineering Group, AUA400/1500, Federal Aviation Administration, Washington, D.C., December 1995.) The inventive traffic adviser provides constantly updated queue-comparisons to FAA tower controllers according to all defined splits. This data allows controllers to change the split in real-time in order to keep the departure queues balanced, thereby reducing the departure taxi times overall.

Integrating Domains of Control. Another source of inefficiency ameliorated by the inventive traffic adviser is the lack of data sharing and cooperation between different domains of control. In typical U.S. airport operations, for example, aircraft control is distributed between non-governmental entities (i.e., airline, airport/ramp) and governmental entities (i.e., control tower) depending on a given aircraft's location.

As a result, at U.S. airports airlines generally have the right to push back any number of aircraft at any given time without regard for the tower's ability to sequence them. Therefore, in the U.S. case, the latitude for taxi route and overall surface movement optimization is severely constrained compared to, for example, much of Europe. The present invention addresses this inefficiency by providing an advanced data acquisition, fusion, prediction, and advisement system.

Data Loss Recovery. A final source of inefficiency that the inventive traffic adviser addresses is potential data loss. Data can be lost at the generation, transmission, reception, or interpretation stages. For instance, such data input failure can be compensated for by averaging past results and predicting likely current and future reference values based on that information.

Safety

Error Correction. In the case of misidentification of aircraft, the inventive system has the capacity to identify the error through its multiple input and identification capabilities. After the error is identified, the inventive traffic adviser further has the capacity to rapidly update system reference values and present the supplemental information for cross-checking. Multiple inputs for the same information in the subject invention provide the ability to cross-check for errors that are currently not available in single-input systems typically used by tower ground controllers.

Emergency Alternative Backup System. The subject invention also provides an emergency alternative backup system in the case of either data-loss, or partial or even full core-system failure. While this information may not be as exact as the core-system data, because it is derived from multiple sources it can provide data which enables ground controllers to make reasoned decisions in such emergency circumstances. Such redundancy will prove very useful in the future.

Emergency Contingency Planning. In the event of crashes, shutdowns, runway loss, natural disasters, and other contingencies, the present invention allows a unique advantage in providing rapid re-planning of surface traffic movement. Multiple scenarios can be tested in advance to provide effective contingency plans. Furthermore, when an actual contingency arises, a custom-made plan can be rapidly formulated, and various scenarios can be immediately tested and evaluated, by the predictive aspects of the present invention. Plans thus customized to meet a current contingency can be put in place with a high likelihood of effectiveness.

The net effect of this proactive, efficient, ground traffic re-routing is to minimize or eliminate the need for airborne planes to undertake lengthy holding patterns or be re-routed to other airports which may be suffering from the same contingencies. By example, the number of airborne planes in bad weather with low fuel would be minimized by the present invention, thereby ameliorating a potential safety risk.

Safety Through Efficiency. A special feature of the subject invention is that it allows air traffic controllers to most efficiently balance takeoff queues in order to minimize taxi and waiting time. This increases efficiently, and ultimately allows a airports higher traffic throughput without the great expense of physical improvements. This is particularly important in high density metropolitan areas where airfield expansion is not possible.

In addition to assisting ground controllers, the inventive traffic adviser also optimizes the activities and functions of airport employees, as well as airline personnel. These activities include baggage management, aircraft fueling and servicing, ramp and stand allocation, etc. The inventive system also provides increased traffic management safety through its simulation and training capabilities.

Simulation & Training

Archival Playback. The inventive traffic advisor can replay archived data collected from a variety of airports. This allows realistic simulation of a broad range of ground traffic management situations for training purposes. Both new and experienced ground traffic controllers, as well as other airline and airport personnel, can greatly benefit from being trained on such a realistic system.

Advantages of this type of training include the reduction of the need for actual on-the-job training, increased experience by exposure to novel situations, and an ability to experience and be trained for emergency situations.

Simulated Scenarios. In addition to replaying archived data, data inputs can be modified or fabricated to provide trainees with any conceivable ground traffic management scenario. Teachers can tailor the training scenarios to address specific student needs or to train students for eventualities that are anticipated for specific airports.

Moreover, ongoing continuing education will allow facility for systems that are going to be implemented in advance of their installation at airports. For instance, new routing schemes, additional runways, new types of aircraft, etc., can all be simulated, allowing for proactive training.

Experienced ground controllers, in particular, will benefit from simulated experiences in airports that they have never worked in and simulated scenarios that they have never encountered. The curriculum can be made considerably more rigorous for these individuals, thereby further developing in them those leadership capabilities that are especially valuable in emergency situations.

Modeling. The modeling capacities of the present invention allow accurate prediction of the outcomes and consequences of various proposed designs for airports, runways, routing, etc. With these scenarios, operations analysts will be able to optimize their designs and avoid unexpected and costly deficiencies prior to actual implementation.

For example, the inventive system has the capacity to make use of and synthesize actual historical data from a variety of airports. It also has the capacity to patch together different design features and results from actual airport working data. The inventive system is therefore a uniquely powerful tool for testing and evaluating contemplated design outcomes.

Efficiency & Safety. The net advantage of this comprehensive training capability is two-fold: an increase in efficiency and monetary savings, and an enhancement of the safety management capabilities of the trainees with a corresponding improvement in overall airport safety.

Meeting U.S. and Pacific Rim Airport Challenges

At some airports, information from non-governmental sources is not generally available to the tower controller. In typical U.S. airport operations, aircraft control is distributed between non-governmental entities and governmental entities depending on a given aircraft's location. For instance, airlines generally have the right to pushback any number of aircraft at any given time without regard for the tower's ability to sequence them. The latitude for surface traffic optimization is severely constrained compared to Europe, leading to an inability to effectively use existing European systems in these contexts.

An additional complication in Pacific Rim airports is the high demand for airline traffic throughput and the generally rudimentary air traffic control management systems available. These rudimentary systems, when further burdened by undirected independent private airline sequencing, are relatively inefficient and limited in their air traffic capacity. Therefore, the special advantages of the present invention have a uniquely high value for improving efficiency and safety at these airports.

The challenges of coordinating disparate non-communicating data sources and proprietary routing decisions are met by the present invention. This diversity of sources and these proprietary sensitivities are dealt with by the inventive system's neutral rule-based advisements which it develops from comprehensive data inputs.

Airlines have serious concerns with respect to allowing competitors access to their proprietary routing data. The communication barriers that result from these concerns are obviated by having a neutral, confidential, and centralized prediction system. This system provides the critical predictive values needed for efficient routing without requiring disclosure of sensitive proprietary data to competitors.

Data transfer between stations in US and similar airport tower operations relies upon a combination of voice communications (i.e., radio, telephone), hand-carried printed paper strips, and grease pencil displays. Similarly, information from tower controllers is generally not available to non-governmental sources. Again, the inventive system provides a neutral and confidential mechanism for providing surface traffic optimization data without revealing the proprietary information it is based upon. In this way, essential data is made practically available to all relevant parties.

Comprehensive Advisory Outputs

Through the client interface subsystem, a preferred embodiment of the present invention provides client-users with various advisory outputs for each flight departing or landing at the airport.

Departure Data. Departure data from terminal radar systems can include call sign, aircraft type, departure runway or complex, time of take-off, and the time and position the aircraft leaves terminal radar airspace. Additional departure data is derived from airlines, such as time of pre-push warning, time of push-back, duration time of taxi-out or push-back to take-off, gate number, and ramp number. Ground surveillance radar data can include the actual number of aircraft in each departure queue, the number of aircraft in a predicted departure queue that are from the same airline, and predicted taxi-out duration.

Based on these airline-provided schedules and departure-related events, as well as on gate assignment, airport configuration, recent statistical data, and ground surveillance data when available, the traffic advisor predicts predicted push-back time, predicted take-off time, and the predicted number of aircraft in future departure queues.

Based on terminal radar data and airline-provided departure data, the traffic advisor predicts airport-wide departure information. Such information includes actual hourly departure rates per runway, actual hourly departure rates for the airport, true airport departure demand, dynamic queuing predictions for use in runway balancing, and airport departure restrictions.

Arrival Data. Arrival data from terminal radar systems can include positional information, call sign, aircraft type, landing runway or complex, time of hand-off from regional to local air traffic control, the time the aircraft crosses the outer marker/final approach fix, and touchdown time.

For airlines that provide their proprietary data, the traffic adviser will display the assigned gate, the assigned ramp, the time the aircraft arrives at the gate, and the duration the aircraft takes from touchdown to gate.

Predicted arrival times are calculated for each arriving aircraft based on its position and velocity relative to the airport, aircraft type, and past statistics of arriving flights.

Predicted taxi duration from the time of touchdown to gate is calculated for each arriving flight based on the current airport configuration, arrival runway, gate assignment, recent statistics of arriving flights, and number of preceding landing aircraft.

In the event an arriving flight executes a go-around or missed approach, the traffic adviser notifies users with a data message or display item. The airport scenario is updated, and the status of the flight is kept as a go-around, until the flight reenters the normal flow of arriving aircraft.

Information as to the overall airport is also predicted. Using airline arrival event data and terminal radar data, the traffic adviser computes and provides or displays actual arrival rate per runway, and actual arrival rate for the entire airport.

Additional Outputs. When provided by the airport or tower personnel, the traffic adviser provides or displays overall airport configuration data including: current airport landing direction and departure split; runway and taxi closure start and stop times, history of airport configuration changes, history of daily airport events, and history of gate utilization by concourse, aircraft type, and airline. The traffic adviser also predicts the effects of forecasted weather on the current airport configuration, according to a user-determined time horizon.

The traffic advisor provides a summarized airport history, and on-request, airports events calculated on a daily, weekly, monthly, or yearly basis. It also dynamically displays an indication of the current level of participation by airlines in providing data about arriving and departing flights, and push-back events for departures. The traffic adviser also indicates the status of other input sources. Finally, the traffic adviser provides a confidence number based on current airline participation levels with respect to predicting surface traffic status.

Overall Functional Architecture

The present invention is made up of a number of synergistic sub-systems which provide data acquisition, database serving, data fusion, data prediction and monitoring, system execution, system error reporting, and user interface functions.

Multiple heterogeneous incompatible data sources are acquired by the input management subsystem, which processes and routes this data to the information subsystem, which incorporates a database. The information sub-system routes data to the prediction subsystem, which then provides predicted and actual data back to the information subsystem. Both parsed real-time and published data, as well as predicted data, are then routed to the client interface sub-system and, optionally, to an archival database. All sub-systems and system health are monitored and controlled by the executive sub-system.

Input Management Subsystem. This is a front-end subsystem which interfaces both with the traffic adviser's architecture and a variety of data feeds. It runs the requisite network protocols, multiplexors, and sequencers to handle the asynchronous inputs from external systems.

This subsystem has the capacity to acquire data from a wide variety of sources, data acquisition interfaces, and means of connection. These sources produce real-time and published data in disparate and often incompatible formats and input and update rates. The inventive traffic adviser is able to assimilate, parse, and interpret the data from these data agent sources for subsequent use by other subsystems.

Exemplary of the types of diverse inputs which can be utilized by the present invention are real-time terminal radar data, real-time tower routing and location data, real-time proprietary airline routing and location data, real-time ramp and service location data, real-time on-board transponder or other aircraft location systems data, FIDS (flight information display system) data, published OAG (official airline guide) data, and other types of data sources (e.g., ASDE/AMASS, other air traffic automation systems such as CTAS, or GPS systems).

Information Subsystem. This subsystem acts as the central coordination subsystem. It integrates data streams from the input management subsystem into the appropriate traffic adviser data structures; triggers model updates and user notifications; formats and isolates the data for appropriate users; and displays, archives, and implements the required housekeeping tasks that include accounts, access rights, data integrity, backups, and archives. The information subsystem also includes a library and stored procedures called by routines in the other subsystems, and has certain common routines shared by more than one subsystem.

The information subsystem works in concert with a database to store and compare incoming data with previously stored data. This serves as a redundancy filter and is the basis for error-checking and data-fills. The database can either be fully integrated into the information subsystem or it can act as a stand-alone database. The advantage to the latter configuration is that it is then transportable to other installations of the traffic adviser.

In a preferred embodiment of the present invention the database is relational. This enables automatic concurrent updating of related fields, and user can individually configure the database for their particular requirements.

In another preferred embodiment, external databases and servers work in conjunction with the information subsystem to allow data exchange and common central storage through internet protocols (e.g., object relational brokers such as CORBA) or emerging 'agent' technologies. This facilitates appropriate integration with collaborative decision-making tools.

Prediction Subsystem. This subsystem is responsible for integrating all the input sources connected to the traffic adviser in order to monitor the progress of arriving and departing flights, and to predict when key events will occur, including pushback, takeoff, touchdown, or gate arrival. The integrated monitoring information and predicted values are fed back to the information system for display by the client interface subsystem.

In a preferred embodiment, the prediction subsystem takes advantage of an integrated collection of predictive heuristic algorithms. The heuristics used in data fusion and in generating predictive event times comprise an expandable rule-based expert system. In addition, basic time estimation algorithms are used to calculate arrival time estimates. As a result, predicted departure data, predicted arrival times, predicted taxi durations, and predicted airport configurations have a high level of reliability and accuracy, making the traffic adviser uniquely powerful and productive.

Optionally, the database is provided with an archival capacity. This serves to store and retrieve extensive amounts of past data which can be used for training and simulation purposes or to review and model past events. This allows greater information about and insight into current situations similar to historic events, thus improving ground traffic management efficiency and safety.

Executive Subsystem. This subsystem is responsible for controlling the other traffic adviser subsystems, including: starting and shutting down processes at scheduled times; monitoring systems components for error and warning conditions; notifying system support personnel of detected system errors; and recovery from system failures.

Additional functions include facilitating subsystem debugging, providing remote access to traffic adviser monitoring and control, maintaining system statistics, and managing user accounts. Other programs included in the executive subsystem are a pager process, a reset process, and a remote reset (via telnet) process.

Client Interface Subsystem. The client interface subsystem is a collection of programs which provide a graphical user interface (GUI) to the traffic adviser. This subsystem establishes and implements a communication scheme for passing traffic adviser data to local displays, or acts as a data feed in an agreed upon protocol. The subsystem also coordinates data updates among all traffic adviser users.

This subsystem is designed for modular expansion to handle the evolutionary growth requirements inherent in the system. By example, the invention can include wide-area network (WAN) distribution of data to airlines at remote locations or other airports. A World Wide Web interface (e.g., XML), as well as a 3-D interface (e.g., VRML), can also be implemented.

In one embodiment the client interface subsystem: distributes flight data from the information subsystem to various external destination sources or client-users via socket connections; provides a graphical user interface for continuously displaying flight data on a bit-mapped display, and for executing various commands to change the flight data or the method of its display; starts a client interface subsystem, and provides a limited number of automatic restarts if the client interface subsystem fails; provides traffic adviser status and schedules data to external destinations and user-clients over a network socket or a UNIX-domain socket; and provides status and schedules data to external user-clients via a serial line, wherein the data is provided as messages written to standard output formats so it can be read either over a serial line or on a screen.

Field Tested Prototype

The overall architecture of a preferred embodiment of the present invention, a real-time surface traffic adviser 100, will be described in relation to FIG. 1. The traffic adviser 100 generally includes an executive subsystem 102, an information subsystem 104, an input management subsystem 106, a prediction subsystem 108, and a client interface subsystem 110, that are interconnected to interchange real-time aircraft operations data between the FM, various airlines, the city Department of Aviation (airport management), and the ramp controllers. In addition to improving the level of coordination between these groups, the traffic adviser 100 generates its own value-added data products for the use of these groups, such as estimated at-gate aircraft arrival times and estimated aircraft departure times.

Figure 3:
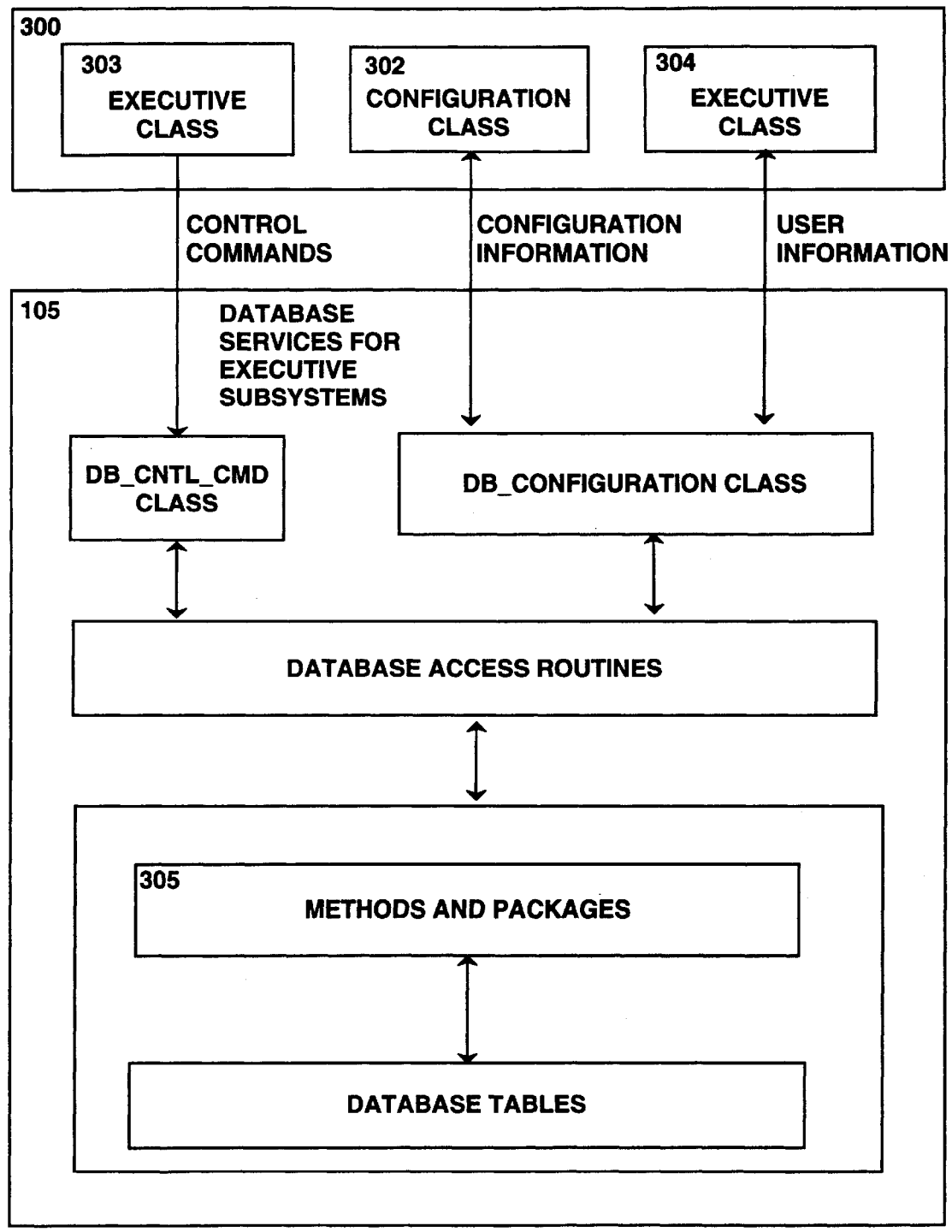
FIG. 3 a high level block diagram of the executive subsystem of FIG. 2.

The executive subsystem 102 is responsible for controlling the other subsystems, starting and shutting down processes at scheduled times, monitoring system components for error and warning conditions, notifying system support personnel of detected system errors, and, when possible, recovering from system failures. Additional duties of the executive subsystem 102 include facilitating subsystem debugging, providing remote access to the traffic adviser monitoring and control, maintaining system statistics, and managing user accounts. Other programs included in the executive subsystem 102 enable it to issue commands to reset various hardware components of the traffic adviser 100. The executive subsystem 102 and its operation are illustrated in FIGS. 2 and 3.

The information subsystem 104 integrates the remaining subsystems 102, 106, 108, 110 and offers services in four categories:
1. The information subsystem 104 communicates traffic raw data Inputs from automatic data streams and manual inputs to the prediction subsystem.
2. It provides inter-process management and control.
3. It supports information processing.
4. It provides system housekeeping.

Figure 4:
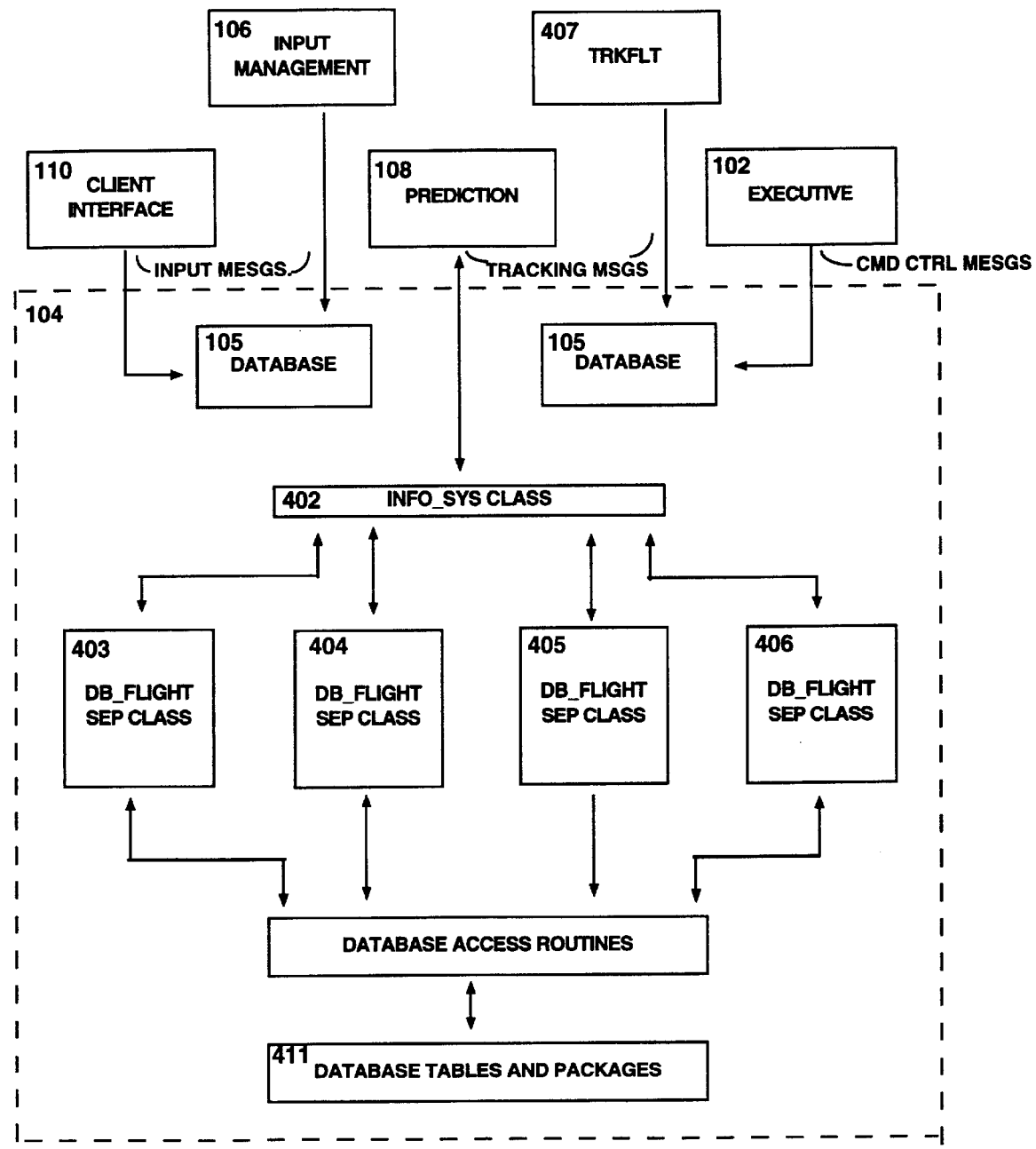
FIG. 4 is a high level block diagram of an information subsystem forming part of the traffic management system of FIG. 1.

The information subsystem 104 is illustrated in FIG. 4.

Figure 5:
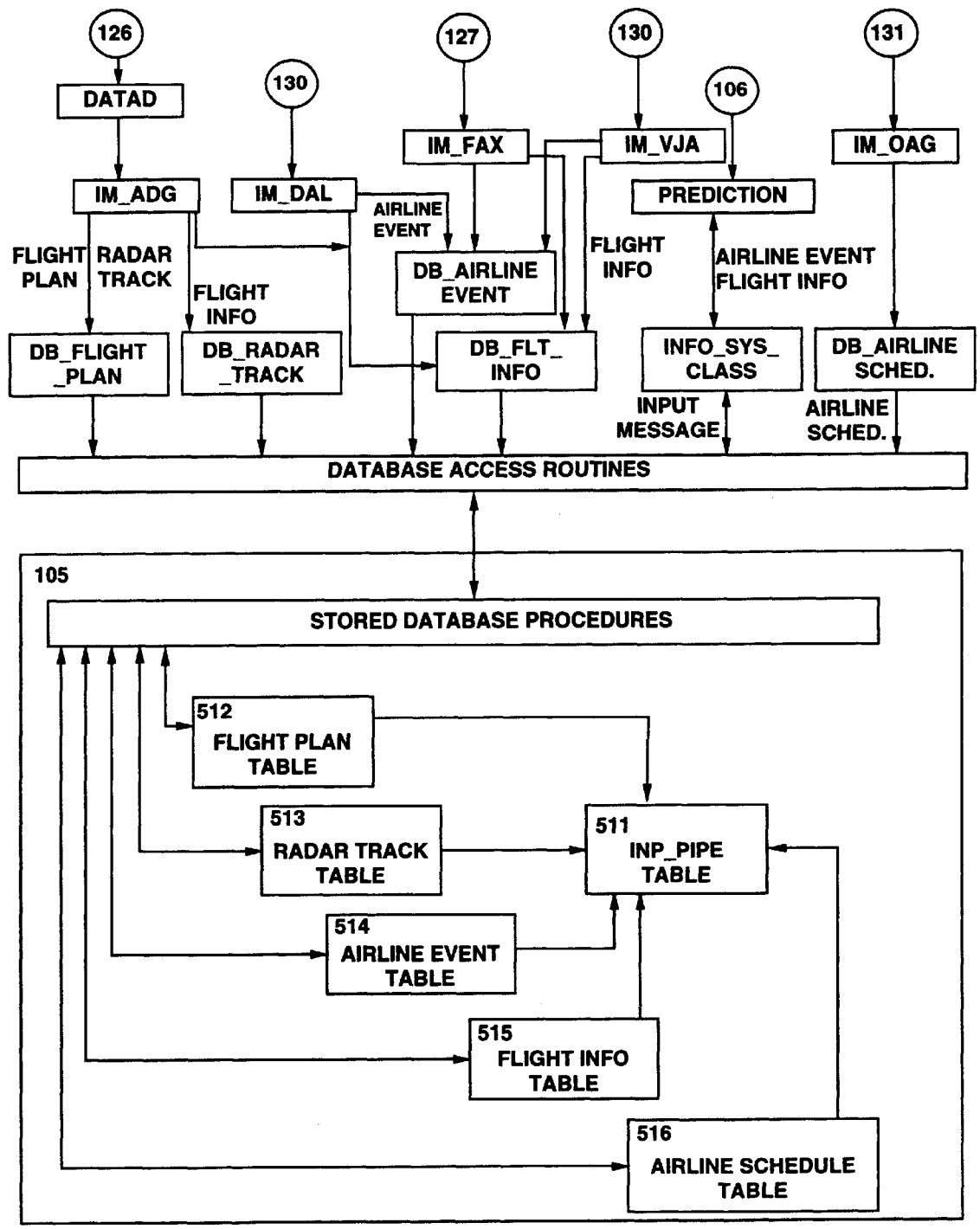
FIG. 5 is a high level block diagram of an input management subsystem forming part of the traffic management system of FIG. 1.

The input management subsystem 106 is a collection of software programs dealing with various external input data sources 115 that are connected to the traffic adviser 100. The input sources 115 provide data, in "real-time" over network or serial links, such as FTP file transfer, to the input management subsystem 106. In turn, the input management subsystem 106 feeds the data to the information subsystem 104. The input management subsystem 106 is illustrated in FIG. 5.

Figure 6:
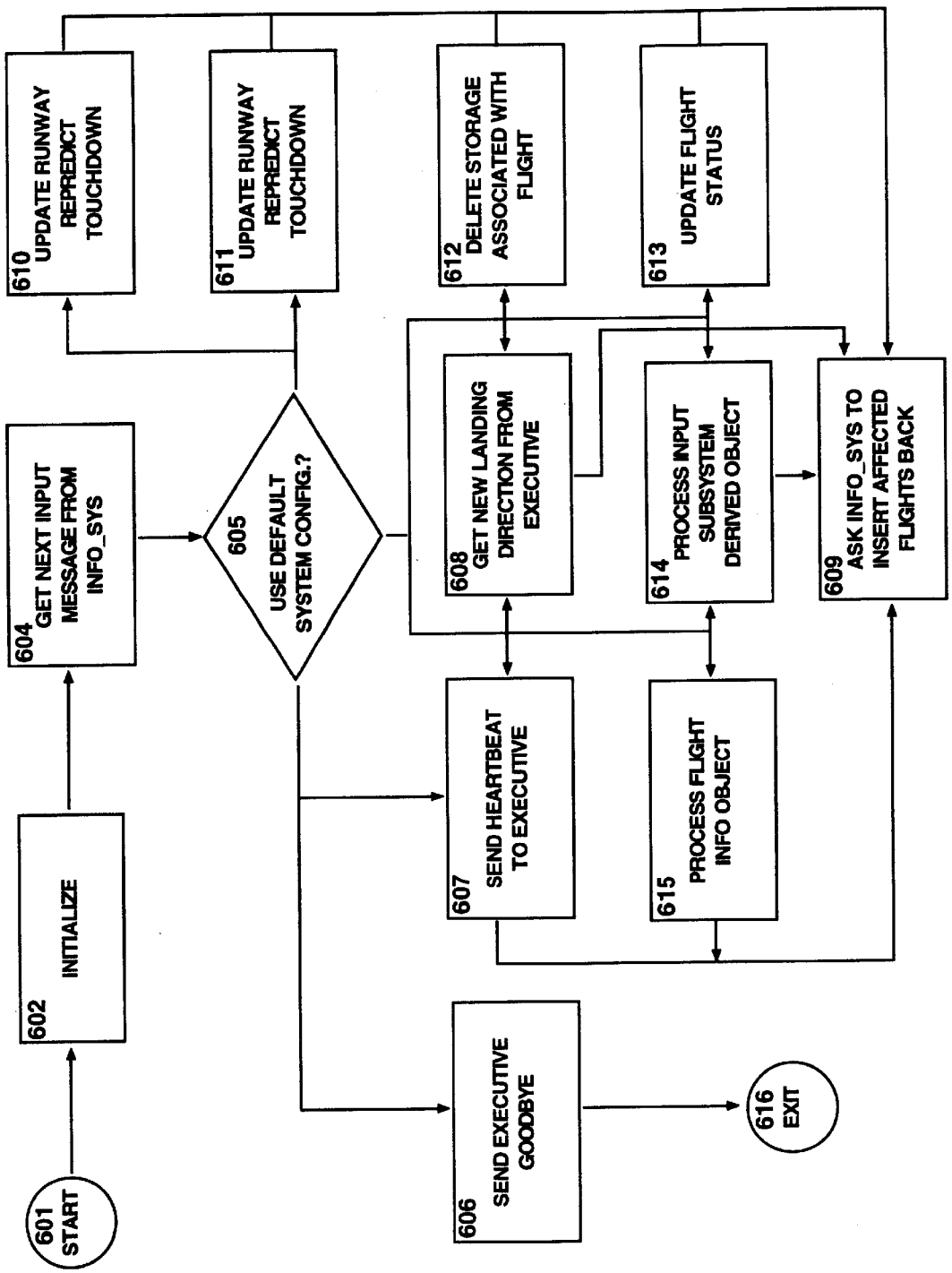
FIG. 6 is a high level block diagram of a prediction subsystem 108 forming part he traffic management system of FIG. 1.

The prediction subsystem 108 is responsible for integrating all the input sources 115 connected to the traffic adviser 100, in order to monitor the progress of arriving and departing flights, and to predict when key events will occur, including pushback, take off, touchdown, or gate arrival. The integrated monitoring information and predicted values are fed back to the information subsystem 104, for display by the client interface subsystem 110. The prediction subsystem 106 is illustrated in FIG. 6.

The client interface subsystem 110 is a collection of software programs that provide a graphical user interface to the traffic adviser 100. In a preferred embodiment, the client interface subsystem 110 performs the following functions:
1. It distributes flight data from the information subsystem 104 to various external destinations sources or clients 117, via socket connections.
2. It provides a graphical user interface for continuously displaying flight data on a bit-mapped display, and for executing various commands to change the flight data or the method of its display.
3. It starts a client interface subsystem, and provides a limited number of automatic restarts if the client interface subsystem fails.
4. It provides traffic adviser status and schedules data to the external destinations 117 over a network socket or a UNIX-domain socket.
5. It provides traffic adviser status and schedules data to the external destinations 117 via a serial line. The data is provided as messages written to standard output so it can be read either over a serial line or on a screen.

Figure 7:
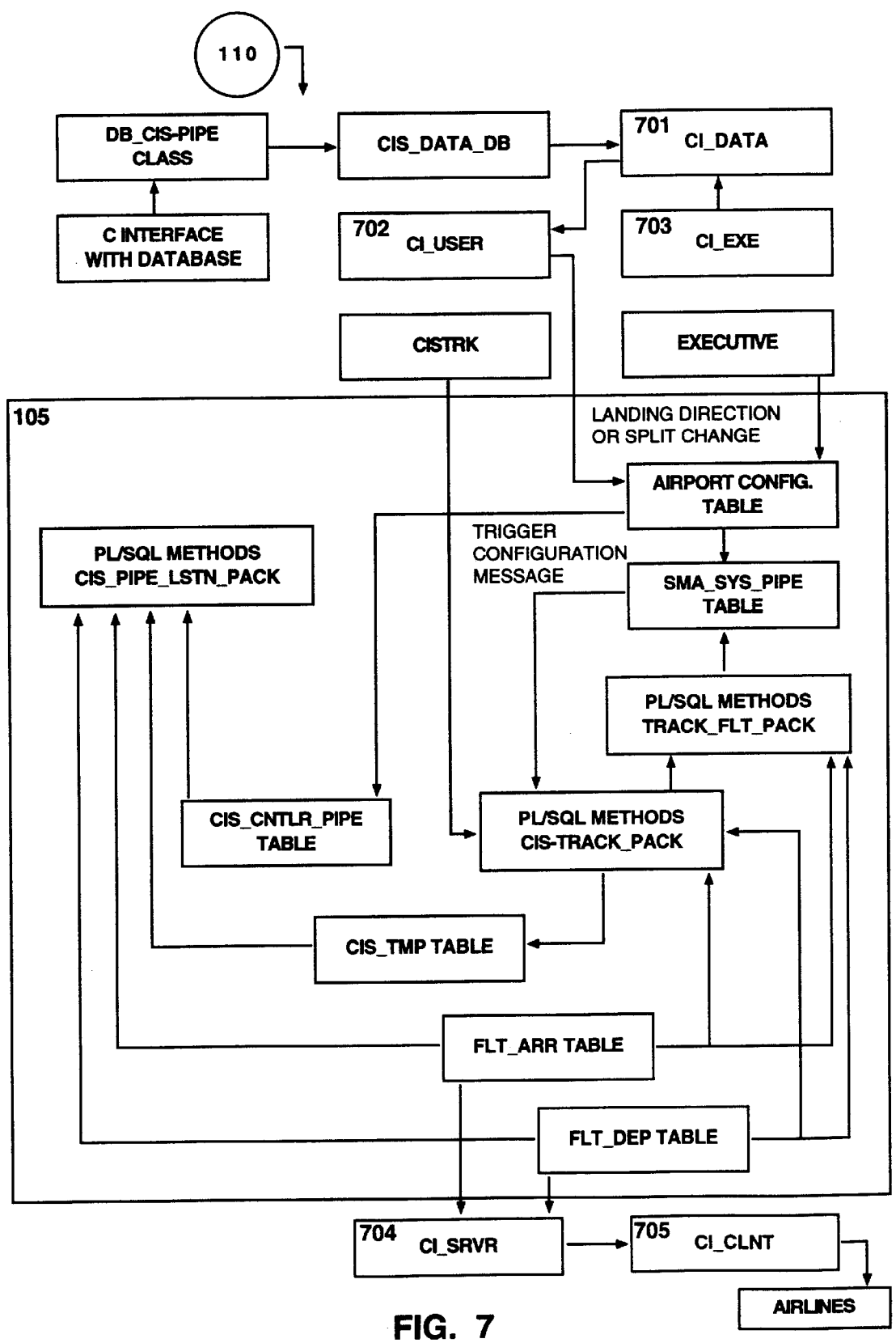
FIG. 7 is a high level block diagram of a client interface subsystem forming part of the traffic management system of FIG. 1.

The client interface subsystem 110 is illustrated in FIG. 7.

Overall Hardware Architecture

The traffic adviser 100 system hardware includes a server and multiple workstations. Most of the software runs on the server. Various network and communication devices are used as part of the operational traffic adviser 100, including network routers and hubs and the associated cabling, a terminal emulator, and several modems. The server and all the workstations are connected via Ethernet in a Local Area Network (LAN). Display hardware includes X-Window system display servers, either as stand-alone X-Window servers or workstations or PC-based X-Window servers. Stand-alone flat-panel LCD touch-screens are used in the FAA Tower Cab to provide traffic adviser display information for the FAA Tower controllers and supervisors 140. The screens allow FAA Controllers 140 to enter a limited amount of data into the traffic adviser 100 and to control the content of the displays. PC-based displays are used in the Ramp Towers 140 by airline controllers and airport operators.

The hardware for the server and the workstations is standard commercial computer equipment, available, for instance, in the United States from Silicon Graphics, Mountain View, Calif. All the traffic adviser software programs except one (datad) are executed by the traffic adviser server. The datad program is part of the input management subsystem 106, and is executed at least in part by workstations. It should be clear that datad can also be executed on the server.

The traffic adviser 100 may optionally include an archive file 151 to which data from a database 105 is periodically transferred for storage. The archive file may be selectively accessed by the various subsystems of the traffic adviser 100 and/or the clients 117.

The Executive Subsystem 102 (FIGS. 2, 3)

The primary responsibilities of the executive subsystem 102 are to control the various traffic adviser subsystems 102, 104, 106, 108, 110; to start and shut down the traffic adviser processes at scheduled times; to monitor system components for error and warning conditions; to notify the traffic adviser system support personnel of detected system errors; and, when possible, to recover from system failures. Additional duties of the executive subsystem 102 include facilitating subsystem debugging, providing remote access to the traffic adviser monitoring and control, maintaining system statistics, and managing user accounts.

Typical use of the executive subsystem 102 entails starting the executive subsystem process 200 (FIG. 2); updating the traffic adviser system configuration; then commanding the executive subsystem 102 to start selected sections or routines of the traffic adviser subsystems 104, 106, 108, 110. The executive subsystem 102 starts the processes 104, 106, 108, 110, and monitors the subsystems health. When scheduled process idle times or start times arrive, the executive subsystem 102 automatically shuts down or starts selected routines of the traffic adviser subsystems 102, 104, 106, 108, 110, as appropriate. The executive subsystem processes 200 is intended to run continuously.

The executive subsystem 102 maintains a traffic adviser system configuration that includes the traffic adviser system operation mode, airport configuration parameters, active and inactive traffic adviser subsystems, subsystem debugging information, and user authorizations. The active traffic adviser configuration is stored in the database 105 for access by all traffic adviser processes (to be described later). The traffic adviser system administrator may also save named configurations in the database 105 or in a file for later recall at system startup. The active configuration is stored in the database 105 under the name "current." A configuration is loaded into the executive subsystem 102 each time it is run. The configuration stored in the database 105 under the name "default" is loaded as the default configuration.

The executive subsystem configuration maintains a record for each subsystem process in the traffic adviser 100. This includes an indication of whether each process is active, idle, excluded, or in an error condition. Active processes are those currently running. Excluded processes are those that will not be run in the current configuration even if they have a scheduled start time. Idle processes are not currently running, but will start at their scheduled start times. Error conditions occur when the executive subsystem 102 detects a problem with a process.

Once the configuration of the executive subsystem 102 is set up, the operation of the traffic adviser 100 is mostly automatic. The executive subsystem 102 can be commanded to start all desired traffic adviser processes automatically, or a system operator 118 (FIG. 1) can start each traffic adviser process individually. Once a process starts, the executive subsystem 102 will monitor this process to ensure it continues to run properly. Processes can be scheduled to automatically start and shut down at specific times. The executive subsystem 102 also gathers statistics on traffic adviser uptime and availability.

The executive subsystem 102 can be started in a reattach or remote modes. In the reattach mode the executive subsystem 102 reestablishes control and monitoring over currently running traffic adviser processes. The reattach mode is used in the event that the executive subsystem 102 needs to be restarted.

The remote executive mode is used when a primary traffic adviser executive subsystem 102 is already running, but a remote user 119 (FIG. 1) from another location wishes to monitor or control the traffic adviser 100. The remote executive mode establishes an inter-process link with the primary executive subsystem 102 and allows the remote user 119 to view the same information available on the primary executive subsystem 102 and to send commands to be executed by the primary executive subsystem 102.

With reference to FIG. 2, the executive subsystem 102 startup begins at step 201 with a configuration editing menu by connecting the executive subsystem 102 to the database 105 (step 202), and inquiring whether or not to use the default system configuration (step 203). This allows the operator 118 to input the desired configuration name (step 204), to load a saved traffic adviser configuration from a file or the database 105 (step 205). Alternatively, the executive subsystem 102 loads the default configuration from the database 105 (step 206). The operator 118 can then edit individual configuration parameters (step 207), and the executive subsystem 102 inquire whether or not to save the updated configuration (step 208). The operator 118 can then input the configuration name (step 209), delete the saved configurations, and edit the user account information. The executive subsystem 102 then saves the updated configuration in a file or the database 105 (step 210).

The executive subsystem 102 then inquires whether or not to start the traffic adviser 100 (step 211). If a start process command were issued, the executive subsystem 102 will automatically start the designated processes in a predefined order. For most process start commands, the executive subsystem 102 will spawn the process (step 213) and move on to the next task (step 212), gathering messages from newly started processes as they arrive. For some processes the executive subsystem 102 has a built-in delay after the process starts to allow time for initial or complete processing to occur. This is used for processes that might have trouble if they were interrupted during that initial execution period. For instance, the database backup process is run when no other processes, including the executive subsystem 102, are updating the database tables.

Starting the executive subsystem 102 in reattach or remote mode will bypass the configuration editing menu, immediately placing it in the control and monitoring loop. While in the control and monitoring loop the executive subsystem 102 will receive system messages transmitted through the database by traffic adviser 100 processes. These messages have a designated criticality.

The executive subsystem 102 periodically checks for new incoming system messages (step 214), for instance once per second. Every 30 seconds the executive subsystem 102 checks on the health of the traffic adviser 100 processes and performs any process starts or shutdowns scheduled for that time period.

While in the control and monitoring loop the executive subsystem 102 will display a scrolling list of incoming system messages (step 215), and will accept control commands from the traffic adviser operator 118 and consequently update the last message received, and the time the last system message was received from that process. (step 216).

The executive subsystem 102 determines whether each received message is a request or a failure notification (step 217). If it is, then a routine designated to handle this request or failure is called (step 218). A 'request heartbeat' command sends a request for a heartbeat message to a specified process (step 219). If the process is healthy and accepting the executive subsystem 102 commands, it will respond with a HEARTBEAT system message.

An 'enter split' command is used to enter a new airport split. The command displays the current split. prompts for the name of the new split. and updates the traffic advisor configuration with the new spilt. As an example. split names may be specified in terms of airborne Standard Instrument Departure (SID) fix names (typically designated by departure headings. such as N1, N2, E1, E2, S1, S2, W1, W2, or N for both North fixes. etc.). with a backslash, "/", separating the departure fixes assigned to the North runway complex on the left of the "backslash", from those assigned to the South complex on the right of the "/", For instance, for active North and South departure runways, then the split NWE1/SE2. would associate both North SID fixes . both West SID fixes, and the East 1 departure fix, with the North runaway complex; and both of the South fixes and the East 2 fix with the South runway complex.

An 'update landing direction' command is used to enter a new airport landing direction. The current landing direction is displayed and the operator is prompted to enter a new landing direction (i.e., EAST or WEST).

A 'process start or shutdown' command allows the operator to start processes or shut down active processes (step 220). A list of processes with their current status is displayed. The operator 118 can choose to shut down the entire traffic adviser 100 system (step 221) or select a process to start or shut down (step 222). H a process start is requested, the executive subsystem 102 will spawn that process (step 223).

If a process shutdown were requested, the executive subsystem 102 asks if automatic scheduled startups should be allowed, or if an immediate restart is desired. The executive subsystem 102 then sends a shut down command to the process (step 221). If the process doesn't respond to the shut down command, the executive subsystem 102 will terminate the process (step 224). This is repeated a number of times if the process does not exit immediately. If automatic scheduled starts are desired, the process status is set to IDLE (step 225) so the starts will occur. If scheduled starts are not requested, the process status is set to EXCLUDED. If an immediate restart is requested, the process is started after the shutdown sequence is complete.

When a process start or shutdown command, or a system shutdown command is issued, the executive subsystem 102 asks the operator 118 to confirm the command in case the incorrect process was selected Also, a system shutdown command issued from the remote user 119 will cause the primary executive to shut down all of the other traffic adviser processes, but the primary executive subsystem 102 will not shut down.

A 'quit' command shuts down the executive subsystem 102 process (step 227) without shutting down the rest of the traffic adviser processes. This is a preferred exit for the remote user 119. The command can also be used to exit (step 228) the primary executive subsystem 102 to restart it in the reattach mode so it can read updated parameter files without shutting down all of traffic adviser 100.

In addition to the above process 200, the executive subsystem 102 performs various housekeeping tasks for the traffic adviser 100. Early each morning when the airport traffic load is light, the executive subsystem 102 shuts down the traffic adviser 100 and runs housekeeping processes. These processes include a backup and cleanup of the traffic adviser database 105, a database time synchronization process, and a process to reset the ARTS Data Gatherer (ADG) 126. After the housekeeping processes are complete, the traffic adviser 100 processes are restarted and the traffic adviser 100 returns to normal operations.

Periodically, i.e., every 30 seconds, the executive subsystem 102 performs a system health check. This involves checking on the traffic adviser process activity and status. The primary health monitoring mechanism is the heartbeat message.

Most of the traffic adviser processes are set up to send heartbeat system messages at regular intervals. The default heartbeat interval is set to one minute, but some processes send heartbeats more or less frequently depending on how long the process needs to spend in input routines, etc., and how quickly the process must recover from failures. Standard heartbeat routines were provided for the processes to use. The executive subsystem 102 keeps track of when each system message is received from each process. There are parameter files that specify time-out periods for each process. These time-outs can vary for different times of day if more or less activity is expected for different periods. If the executive subsystem 102 does not receive a system message from an active process within its designated time-out period, it begins a failure recovery routine.

For those processes that do not send heartbeat messages, the executive subsystem 102 checks process health to determine if the process identification (PID) number is still active. Some processes will send a message containing their PID to the executive subsystem 102 on startup. For other processes the executive subsystem 102 uses the PID of the spawned process X-window and assumes that the process has not exited as long as the window is still active. If a process PID health check fails, recovery procedures begin.

The executive subsystem 102 can also monitor the number of records processed by a subsystem by checking the records processed field contained in each heartbeat message. This is intended to detect when a process has lost contact with an input source. A parameter file contains the number of records expected to be processed by a given subsystem during a heartbeat interval. Since some processes receive a variable amount of input during the course of a day, it is possible to set different expected record counts for different time intervals. If a subsystem has a low record count for several consecutive heartbeat messages, the executive subsystem 102 initiates failure recovery for that process.

When the executive subsystem 102 detects a process heartbeat time-out or an inactive process identification number, it begins an automated process failure recovery procedure.

If the executive subsystem 102 is unable to automatically recover from a process failure, or if it detects a problem in the executive subsystem 102 process itself, it has the capability to notify the traffic adviser support or maintenance personnel. This is accomplished through electronic mail messages and through an automated paging program. If an unrecoverable failure occurs, the executive subsystem 102 composes an electronic mail message that indicates which process has failed, when the failure occurred, and what the significant failure symptoms are. This mail message is automatically sent to the traffic adviser support or maintenance personnel.

With reference to FIG. 3, the executive subsystem process 200 is composed of several object classes, some of which are shared with other traffic advisor 100 subsystems, via links labeled as "message arrows" (FIG. 1. "start-up message" and "error messages") which provide the interface between the executive subsystem 102 and the information subsystem 104). The $SMA_{13}$ process class 300 is a base class for the main process in each traffic adviser process. It provides an interface between the processes and the traffic adviser 100 configuration information stored in the information subsystem 104. It retrieves and stores the debug information for each debuggable class contained in the process. The debug information is stored in Config_info class 302. This class also provides the interface to send system messages to the executive subsystem 102 and receive control commands, such as "shut down" or "send heartbeat," from the executive subsystem 102.

An Exec_proc class 303 is the main process class for the executive subsystem process 200. $Exec_{13}$ proc class 303 provides methods to access and update the traffic adviser 100 configuration in the information subsystem 104, read and process system messages, monitor process status, start and stop traffic adviser processes, recover from process failures, and create and destroy remote executive subsystem 102 connections.

The Exec_proc class 303 run method is called with a parameter to indicate the desired executive subsystem 102 run mode (normal, reattach, or remote). In the normal mode it will bring up a configuration editing menu. This allows the operator to update the configuration and run the traffic adviser 100 system. In the reattach mode, it reads the current system configuration from the information subsystem 104. In the remote mode, it reads the current configuration from the information subsystem 104 and sends a system message to the primary executive subsystem 102 to establish a communication link. In each case, the executive subsystem 102 will call a monitor_traffic adviser routine after the configuration is loaded in memory. This monitor_traffic adviser routine reads and processes incoming system messages. In the primary executive subsystem 102 this routine also monitors process health, recovers from process failures, and starts and stops processes at scheduled times.

A User_info class 304 contains information about an traffic adviser 100 user: name, login status, user group, FIDS system, and airlines served. A user_info object is instantiated for each user and stored in the Configuration class 302.
Information Subsystem 104 (FIG. 4)

The information subsystem 104 receives data from the various subsystems 102, 106,108 and 110 of the traffic adviser 100, processes the data and stores it in the database 105, and then feeds back or makes available the data stored in the database 105 to the executive subsystem 102, the prediction subsystem 108, and the client interface subsystem 110 using embedded SQL statements. For the purpose of simplicity of description, the database 105 is considered as part of the information subsystem 104. It should however be understood that the database 105 may be separate from the information subsystem 104.

With reference to FIG. 4, the information subsystem 104 includes an Info_sys object class 402 having four associated classes: Db_flight dep Class 403, Db_flight arr Class,404, Db_common Class 405, and Db_is_pipe class 406; and a trkflt process 407. The database 105 makes up an access and transmittal layer for the communication of messages between the various traffic adviser subsystems. The traffic adviser 100 processes that communicate with the prediction subsystem 108, are the client interface sub-system (CIS) 110, the input management sub-system 106, Trkflt process 407, and the executive subsystem 102. Info_sys class 402 is created by the prediction subsystem 108, and includes methods for connecting and disconnecting from the database 105, and for sending system and error messages to the executive subsystem 102 from the class Db_common 405.

The Db_common class 405 provides methods for connecting to the traffic adviser database 105 and for inserting error messages into an error message table. Db_common also provides a method for getting messages from an input pipe table 511 forming part of the database 105 (FIG. 5).

The Db_flight_arr class 404 provides an object that acts as an interface to a database table 411, containing information about arrival flights. It provides capabilities for creating, updating, and querying information about an arriving flight. The Db_flight_arr class 404 includes a method for connecting and disconnecting from the database 105 from the Db_common class 405.

The Db_flight_dep class 403 provides an object that acts as an interface to the database table 411, containing information about departure flights. It provides capabilities for creating, updating, and querying information about a departing flight in the database 105. The Db_flight_dep class 403 includes a method for connecting and disconnecting from the database 105 from the Db_common class 405.

The Info_sys Class 402 provides an interface object between the inputs and the monitoring and prediction system and between the monitoring and prediction subsystem 108 and the database 105. The Info_sys Class 402 includes a method for connecting and disconnecting from the database 105.

The CIS subsystem 110 and the input management subsystem 106 send prediction messages about flight-events to the information subsystem 104. Landing direction and split changes and removal of flights from displays by air traffic controllers 125 (FIG. 1) are recorded in the database 105. Database entries on these configuration changes also trigger the transmission of messages to the prediction subsystem 108. These messages are routed through the Info_sys class 402 to the prediction subsystem 108. Similarly, database entries for airline_schedule, flight-plans, radar-tracks, and other events are communicated to the prediction subsystem 108 in the form of input messages.

An independent process "trkflt" 407 monitors arriving and departing flights and sends messages about possible changes in status to the prediction subsystem 108 The executive subsystem 102 sends command and control messages such as "SHUTDOWN" and "HEARTBEAT" to the prediction subsystem 108, and the prediction subsystem 108 sends status messages back. The database 105 is the underlying mechanism for communicating these messages to and from the prediction subsystem 108. The Info_sys class 402 manages the interface between the prediction subsystem 108 and the database 105.

Input messages from the CIS subsystem 110 and the input management subsystem 106, tracking messages from Trkflt process 407, and system messages from the executive subsystem 102 are routed through the database 105 to Info_sys 402. The prediction subsystem 108 uses methods within Info_sys 402 to determine the type of message and to obtain the message. The message type is returned to the prediction subsystem 108 by Info_sys 402. By knowing the message type, the prediction subsystem 108 can call the appropriate version of an overloaded method Info_sys 402 formats data from the message body, copies it to the appropriate object's attribute, and returns an object of the appropriate class to the prediction subsystem 108.

Info_sys 402 also routes control-command messages from the executive subsystem 102 and tracking messages between Trkfit process 407 and the prediction subsystem 108. The message type allows the prediction subsystem 108 to invoke the appropriate method that associates the message with the corresponding flight in the prediction subsystem's 108 arrays of flight objects. When notified of a split change, the prediction subsystem 108 calls lnfo_sys 402, which, in turn, sends a message to the prediction subsystem 108 to update the departure and arrival flight information. The message type instructs the prediction subsystem 108 of the correct method to invoke to get the index of the affected flight in the prediction subsystem's 108 arrays of flights. When the prediction subsystem 108 wants to store or request flight information from the database 105, it calls Info_sys's methods for finding, creating, updating and deleting flight-information in the database 105.

A system_message, such as a count of records processed since the last request for "HEARTBEAT" by the executive subsystem 102, is inserted into a "sys_msg" table 411, forming part of the database 105, where it is read by the executive subsystem 102.

The prediction subsystem 108 calls Info_sys class 402 when it is ready to process the next message. When Info-sys class 402 is so invoked for the first time, the database 105 mechanism for retrieving messages is initialized. Using the message type and the message key in the database 105, the message is retrieved from either a table from the executive subsystem 102 or from an input-table, and is returned to Info_sys 402 as a variable length, comma delimited string. The prediction subsystem 108 then calls an Info_sys 402 method to process the input message.

For inputs from the Trkflt process 407 the prediction subsystem 108 calls the appropriate Info_sys 402 method to get the index of the flight that is the subject of the tracking message. Messages generated by a call to get the affected flights are handled in a similar manner to messages from, the Trkflt.process 407.

The prediction subsystem 108 uses information from the input messages to monitor the progress of flights and to predict push backs, take-offs, touchdowns and gate-arrivals. This flight status information is written to the database 105 for display by the CIS 110. Info_sys 402 provides the mechanisms for writing to the database 105. The organization of the database 105 tables and procedures for accessing the database 105, reflects the two types of flights: Departures and Arrivals.

The prediction subsystem 108 calls methods in the Db_flight_dep class 403 and the Db_flight_arr class 404 to store flight information in the database 105. When a row for a flight is inserted in the database 105 the flight's index into the prediction subsystem's 108 arrays of departure objects or arrival objects is also stored in the database 105.

The database 105 is the mechanism for logically connecting a message with the flight that is the subject of the message. When the prediction subsystem. 108 wants to associate a message with a departing flight it calls Info_sys's (402) methods "find_flight_dep." It calls Info_sys's (402) method "find_flight_arr" when it wants to associate a message with an arriving flight. These methods return the array-index of the flight if a matching flight is found in the database 105.

Periodically the prediction subsystem 108 reorganizes the arrays of departing and arriving flight objects it holds in memory. When a flight-object's position in an array changes, the prediction subsystem 108 updates the array-index column in the flight's row in the database 105 to reflect this change. The prediction subsystem 108 updates the array-index column by invoking Info_sys's (402) method "store_new_index" and by passing the flight-type and flight's key as parameters. If the flight is a departure Info_sys 402 passes this request and the flight's key to the Db_flight_dep object 403. If the flight is an arrival, Info_sys 402 passes this request and the flight's key to the Db_flight_arr object 404.

The prediction subsystem 108 expires a departing flight after a take off occurs and expires an arriving flight after it lands. The prediction subsystem 108 expires flights by calling Info_sys's method "expire_flight" and by passing the type of flight and the flight's unique database 105 key as parameters. If the flight is a departure Info_sys passes this request and the flight's key to the Db_flight_dep object 403. If the flight is an arrival Info_sys 402 passes this request and the flight's key to the Db_flight_arr object 404.

The prediction subsystem 108 uses landing direction and departure-split to predict runway assignments. To insure that information on flights reflect the current airport configuration the prediction subsystem 108 reassigns runways each time there is a change. The prediction subsystem 108 calculates average taxi-in times and calls Info_sys 402 to store the values in the database 105.

Other methods in Info_sys class 402, Db_flight_dep class 403, and Db_flight_arr class 404 are used by the prediction subsystem 108 to establish a departing flight's position in one of the departure queues.

The prediction subsystem 108 does a recovery when it starts. When Info_sys's method "get_next_msg" is invoked the first time, the database 105 mechanism for reading input messages is initialized. This starts the recovery process.

During recovery, un-expired flights are deleted and "Airline_event," "Airline_schedule," "Flight_plan," and "Flt_info" input messages about un-expired flights are resent to the prediction subsystem 108. The prediction subsystem 108 processes inputs that have been resent before addressing 'live' inputs from the input management system 106. In this way the information about active flights that was contained in the prediction subsystem's 108 array of flight objects is 'restored' before processing of 'live' inputs resumes.

The Db_common class 405 provides methods for connecting to the traffic adviser database 105 and for inserting error messages into an error message table. Db_common 405 also provides a method for getting messages from an input pipe table.

Services provided by the database 105 portions of the traffic adviser 100 can be logically divided into two categories:

1. services that minimize the impact of incorrect flight-status inputs on the accuracy of displays; and
2. services that support the needs of the other traffic adviser 100 processes In the traffic adviser 100 a flight is an entity with status and times that are continuously updated until the flight expires. Although a flight can be based initially on inputs from a real-time input source such as radar-tracks or on a flight-plan, most flights are based on status inputs from the Official Airline Guide (OAG) 131 or ARTS Data Gatherer (ADG) 126 (FIG. 1). This initial information is updated by inputs from a Flight Information Display System (FIDS) 127 (FIG. 1), and, later, by real-time sources such as Ramp 128 (FIG. 1), Towers 125, and ADG 126.

Input status data progress from published information having lower fidelity to higher. fidelity information. Ultimately, status and times are updated by "firm" information in the form of radar-tracks. This serial progression of flight-status inputs and associated flight-states is a very desirable information flow. The information flow, however, does not occur for all flights, and, the traffic adviser 100 must handle these anomalous information flows. A brief discussion of the range of problems is necessary in order to understanding the challenge presented by these anomalous conditions.

Data feeds from input sources such as ADG 126 or FIDS 127 can be interrupted temporarily. Published schedules that list flights that no longer take place produce erroneous status inputs for these flights. Flight plans for flights that no longer fly may continue to be automatically entered into the FAA's information system where they are picked up by the traffic adviser 100. Because of weather, mechanical problems, or other causes flights frequently do not take-off or land at published times. Similarly many cargo, charter, and air-taxi flights do not depart or land as specified in their flight-plans. As a result status inputs on these flights can be incorrect or may reflect information that is not up-to-date. Without additional intelligence incorrect flight information would be displayed and the overall accuracy of the display lists would be reduced.

To minimize the impact of incorrect status inputs and ensure the highest possible fidelity of flight information these flights need to be removed from display lists until status information of a higher fidelity is received. In one embodiment of the present traffic adviser 100, heuristic assumptions that are intended to minimize the impact of incorrect status inputs were provided by the FAA and implemented by database 105 services and by the prediction subsystem 108.

The design of the traffic adviser 100 places the database 105 in-between the inputs and the monitoring and prediction subsystem 108 segments where it acts as an intermediary. The database 105 is also in-between the monitoring and prediction subsystem 108 side and the client 117 (FIG. 1) side and plays a similar role between the two sides. Lower-level database (105) services required by the major traffic adviser processes are derived from this division of responsibilities. These requirements for database 105 services by the other traffic adviser processes provide a structure for explaining the second role played by the database 105.

The database services required by the traffic adviser 100 processes can be logically divided into four categories:

1. Communicating raw data inputs from automatic data streams and manual inputs to the prediction subsystem 108. Data inputs from automatic data streams and manual inputs are communicated from the Input Management Subsystem (IMS) 106 to the prediction subsystem 108.

2. Providing communications for inter-process management and control. Configuration information is disseminated from the executive subsystem 102 to the other processes. The executive subsystem 102 also sends control command messages to the other traffic adviser processes. The other traffic adviser processes, in turn, respond by sending health and status messages to the executive subsystem 102. User information such as authorization levels is routed to the traffic adviser processes.

3. Support information processing. The flight information displayed by the CIS 110 needs to be identical to that held by the prediction subsystem 108. To this end, a query capability and runway statistics and reports are included.

4. Housekeeping. A security structure and methods for connecting and disconnecting from the database 105 are needed. To this end, an efficient method for cleaning-up input tables is used.

The executive subsystem's 102 interface with the database 105 can be logically divided into three categories:

1. Management and dissemination of configuration information.

2. Sending control commands to the other processes and receiving their responses.

3. Insuring that the correct information exists for the database 105 to generate accurate dates and times.

The traffic adviser 100 configuration information can be logically divided into five categories:

1. traffic adviser 100 operating mode and levels of participation by airlines.

2. Airport-configuration.

3. Sub-systems configurations.

4. Debug levels.

5. User-authorizations.

Through the executive subsystem 102, a system operator 118 can set landing-direction and split. The prediction subsystem 108 uses landing direction and split in formulating the prediction subsystem's 108 and the CIS' 110 runway assignments. When landing direction or split are changed, a "configuration-message" is sent to the prediction subsystem 108 and to the CIS 110.

Process names, status, and operating system process identifiers are necessary to control the traffic adviser processes. The executive subsystem 102 adds information about a process to the database 105. Methods for removing a process from the database 105, for updating a process's status, and for updating a process's process-identifier are provided.

The database 105 makes up an informational access and transmittal layer between the input management sub-system 106 and the prediction subsystem 108. Flight information is input into the traffic adviser 100.

Input Management Subsystem 106 (FIG. 5)

The input management subsystem (IMS) 106 is a general-purpose means of acquiring the data from various sources 115 (FIG. 1), such as ARTS 126, the tower controller 125, the airlines 130, ramps 128, FIDS 127 and the Official Airline Guide (OAG) 131. The IMS 106 receives passenger display data and is interpreted to extract schedule and gate information. The IMS 106 provides InterFacility Message (IFM) data, including Terminal Radar Approach Control (TRACON) flightplans and associated radar-target data.

The IMS 106 has no direct connection to the database 105, but essential values within the database 105 are directly inherited or derived from data supplied by the IMS 106. In a preferred embodiment, the decision to separate IMS 106 from the database 105 is intentional, since it is part of the IMS 106 design philosophy to run as a real-time daemon, since it must operate on data with internal temporal dependencies. The database 105 is not designed to be a primarily real-time system. As a result, there may be occasional latencies that may be encountered in the database 105. The traffic adviser 100 is designed to automatically recover from these database latencies.

One of the design strategies is to run IMS 106 with its own real-time data management system, independent from the state of the database 105. In the event of a traffic adviser 100 and/or. database 105 latency, failure, or restart, IMS 106 processing continues unaffected. It should be clear to a person of ordinary skill in the field that, for certain applications, IMS 106 may alternatively be directly connected to the database 105 and/or the database 105 may be designed to be a primarily real-time system.

With reference to FIG. 5, the database (105) components make up an informational access and transmittal layer between the IMS 106 and the prediction subsystem 108. Flight information is read into IMS 106 from the input sources 115, through several programs. The following are five such exemplary programs: "im_oag," "im_dal," "im_vja," "im_fax," and "im adg."

im_oag receives and processes a file containing airline schedule information from the Official Airlines Guide (OAG) 131.

im_dal receives and processes flight schedules and updates from the Airlines 130.

im_vja receives and processes flight schedules and updates from the Airlines 130.

im_fax receives and processes flight schedules and updates from the airlines connected via the airport's Flight Information Display System (FIDS) 127.

datad is a daemon that receives data from ARTS Data Gatherer (ADG) 126. Datad interfaces with FAA systems and provides FAA data, including radar targets, flight plans, and other interfacility messages to im_adg.

A matching database access-class for each of the input sources 115 provides a method for sending input messages from the input source to the database 105. This is accomplished by inserting the input messages as rows into corresponding database tables 512, 513, 514, 515, 516 dedicated to particular data sources. Messages containing pointers to rows in the source database table are then inserted into an "input-pipe" table (inp_pipe table) 511, such that when a record or a row is inserted into one of the tables 512, 513, 514, 515, 516, the record or row identification (ID) is inserted into the inp_pipe table 511. The inp_pipe table 511 is one of a pair of alternate tables that is read by Info_sys 402, the prediction subsystem's 108 primary database access class.

Prediction Subsystem 108 (FIG. 6)

The prediction subsystem 108 is responsible for integrating all the input sources 115 connected to traffic adviser 100, monitoring the progress of arriving and departing flights, and predicting when key events will occur. The prediction subsystem 108 processes the following input messages—Airline_schedule, Airline_event, Flight_Information, Flight_Plan and Radar—to update the status of flight objects. In addition, it processes airport configuration messages (landing direction, departure split, and flow restrictions) communicated via the executive subsystem 102.

In an exemplary embodiment, the prediction subsystem 108 includes two data files (i.e., AIRCRAFT_TYPES and GATE_TO_RAMP_MAP), and several classes (i.e., Prediction, Flight, Flight_arr, Flight_dep, Flight_arr_pred, Flight_dep_pred, Site, Aircraft, Airport, Runway, Info_sys, Coordinate, Coordinates_Time interval).

The AIRCRAFT_TYPES data file contains a list of aircraft types, including the FAA designation and the aircraft's weight class. The datafile also includes number of engines, engine type (propeller, jet, turboprop) and the SOIR (Simultaneous Operations on Intersecting Runways; possible values 1–5) group.

The GATE_TO_RAMP_MAP data file contains a list of ramps along with a sub-list of gates associated with each ramp. Since the input sources 115 provide traffic adviser 100 with gate assignments rather than the controller preferred ramp assignments, this file is read in at the prediction subsystem 108 start-up and the correspondences used to infer the ramp for a given gate.

The main class in the prediction subsystem 108 is the Prediction class, which runs the top level control loop and calls the other classes to do the work. The top level loop interacts mostly with the Info_sys class 402 and the executive subsystem class. The Info_sys class 402 is an interface class between the prediction subsystem 108 and the database 105. Its function is to provide the prediction subsystem 108 with the next unprocessed message, translate the database 105 tables to objects that other prediction classes can process, and write any updates from the prediction subsystem 108 to the appropriate database 105 tables 411 (FIG. 4).

With reference to FIG. 6, the prediction subsystem 108 starts at 601 and initializes the following sequence of events at 602:

a) it calls a method of the executive subsystem 102 to inform it that the prediction subsystem 108 is now in a 'running' state;
b) it sets-up gate to ramp mapping;
c) it creates the aircraft objects with information about each type of aircraft; and
d) it gets the configuration of the airport and initializes landing direction and split.

The prediction subsystem 108 gets the next input message from the Info_sys 402, at 604. The prediction subsystem 108 then determines the message type at 605. Based on the message type determined at step 605, the prediction subsystem 108 performs alternative processing (or steps) as described below. Possible message types can be divided into three categories: control, status altering messages, and externally generated inputs.

Control messages may be SHUTDOWN, HEARTBEAT, AIRPORT_CONFIG_INFO, EMPTY_PIPE. EMPTY_PIPE control message returns to the top of the loop to get the next message.

If the message type is a SHUTDOWN, the prediction subsystem 108 sends a good-bye message to the executive subsystem 102 and then quits, at 606.

If the message type is a HEARTBEAT request, the prediction subsystem 108 sends a heartbeat to the executive subsystem 102, at 607.

AIRPORT_CONFIG_INFO gets (at step 608) the new landing direction, departure split, and/or flow restrictions from the executive subsystem 102, sets the new values inside the prediction subsystem 108 by calling the appropriate Airport class methods, and then calls Info_sys: (at step 609) to ask it to put all flights that may be affected by the changes back into the input queue for reprocessing. The message types associated with these possibly affected flights are UPDATE_ARR_FLIGHT and UPDATE_DEP_FLIGHT. When the prediction subsystem 108 receives an UPDATE_ARR_FLIGHT, it calls the Flight class to update the flight's arrival runway (using the new landing direction), re-predict the touchdown if the flight is airborne and within radar range, and update the flight in the database 105 (step 610). For an UPDATE_DEP_FLIGHT, it calls Flight to update the runway (using the new departure split and landing direction), re-predict based on the information provided by the last prediction subsystem 108 source's proposed time, and update the flight in the database 105 (step 611).

Status altering messages may be EXPIRE_ARR_FLIGHT, EXPIRE_DEP_FLIGHT, POSS_GATE, POSS_LANDED, POSS_SUSPEND_DEP_FLIGHT, POSS_SUSPEND_ARR_FLIGHT, POSS_NOT_DEPARTED, POSS_OUTSIDE_TRACON, and are generated by the trkflt process. Trkflt is responsible for searching the arr_flights and dep_flights tables in the database 105 periodically.

When the prediction subsystem 108 receives an EXPIRE_{ARR |DEP }_FLIGHT message, it deletes the storage in its internal array of flights (step 612) by moving the last flight in the array to the newly freed index (to close the gap just created), and further updates the database 105 (via Info_sys) to reflect the new index of the moved flight, and instructs the database 105 (via_Info_sys) to mark the original flight as expired.

POSS_GATE, POSS_LANDED, and POSS_OUTSIDE_TRACON messages are received only for arrival flights, POSS_NOT_DEPARTED is received only for departure flights, and POSS_SUSPEND_{ARR|DEP}_FLIGHT messages are generated by trkflt (step 613) when it determines the flights no longer meet the active flight criteria. When any of these messages is received, the prediction subsystem 108 changes (if necessary) the flight status and then calls Info_sys to write the revised flight to the database. The only case in which Flight class would not be called is if a POSS_GATE message is received for a flight that is already marked as being at the gate. In this case, the prediction subsystem 108 returns without any processing.

The final category of message types is caused by externally generated inputs, including manually entered ones. All inputs (i.e., FLIGHT_PLAN, RADAR, FLIGHT_INFO, AIRLINE_EVENT, and AIRLINE_SCHEDULE) are treated similarly by the prediction subsystem 108.

The prediction subsystem's 108 main responsibility lies with monitoring a flight's status, updating that status (step 614, 615) to reflect input data received and predicting when key events will occur. In order to simplify interactions between the database 105 and the prediction subsystem 108, the prediction. subsystem 108 keeps its own arrays for arriving flights and a separate one for departing flights. The arrays have attributes for all information necessary to monitor a flight's status and predict surface situations. The database 105 keeps two corresponding tables, flight_arr and flight_dep, composed of a subset of the attributes known to the prediction subsystem 108. This scheme makes communicating through the database 105 more efficient, keeps tables smaller, and does not require continuous interaction with the database 105 to get a flight's attributes. In addition to storing information about a flight that could be useful to processes down the line from the prediction subsystem 108, the database 105 flight_{arr|dep} tables contain an entry for array index. Whenever a flight is added to the array or moved (because another flight is expired), the database 105 entry is updated. When information arrives to the prediction subsystem 108 via the external inputs type messages, the prediction subsystem 108 looks for the flight to which the information applies, and returns the array index of the flight if it is found and a marker value (i.e.,−1) if it is not found.

If an array index of −1 is returned, meaning the flight was not found in the database 105 and therefore is not in the prediction subsystem's 108 internal arrays, the prediction subsystem 108 first determines whether to create a flight. This decision is based on the type of input received. If the input type is Airline_event, the prediction subsystem 108 does not create a flight—that source is known to be unreliable. It instead ignores the input received. For all other input types, a new flight is created, that flight's update method is called to extract and store any useful information, and then the flight is written to the database 105 (via Info_sys) along with its index into the prediction subsystem 108's internal array. Thus, the next time data is received for the same flight, the Info_sys will be able to find it in the database 105 and return the index to the prediction subsystem 108.

The prediction subsystem 108 processes the input message (steps 614, 615), by implementing the following tasks:
a) get the call sign from the message, and find the corresponding flight object in the database 105;
b) if the flight object is not found in the database 105, create a new flight;
c) update the flight with the new info just received via the input message;
d) write the updated flight object back to the database 105; and
e) If the message is a stub flight message the prediction subsystem 108 looks for the two related flight objects and merges them into a single flight.

The prediction subsystem 108 processes messages from the trkflt process 407 and updates the flight object based on those messages (step 613). The trkflt process 407 monitors the status of flights and issues messages to the prediction subsystem 108 if time has elapsed without the receipt of external input messages.

An embedded knowledge-based system 108 in the prediction subsystem interprets the available inputs received by the input management subsystem 104 and generates "fused" reference data according to the sources' perceived accuracy under the current operating circumstances. Accuracy and reliability are assessed under current operating circumstances based on heuristics obtained in interviews from tower and ramp controllers 128. Higher-accuracy sources are then given greater weight in calculating fused values. Data fusion is necessary because the traffic adviser data sources usually vary (for instance, on departure pushback times) and sometimes are in direct conflict.

Time and trajectory estimation algorithms are used to model airfield operating procedures (runway-to-split assignment, missed approach effects, airfield configuration) and thereby generate advisory data for the FAA tower controllers 125. These advisories cover relative taxi queue times and lengths under alternative airport configurations.

The heuristics used in data fusion and in generating predicted event times comprise an expert system (equivalent to about 100 rules) implemented as C++ methods. Knowledge base updates and revisions have been driven by the results of field testing, and continue with daily operational feedback from users.

In addition, some basic time estimation algorithms are used to calculate arrival time estimates. For instance, the landing time estimate t(R) for a given flight f, between the outer marker and the hand off point. is defined by Equation (1):

$$t_{n+1}(R) = t_{n+1}(H) + \frac{1}{n}\sum_{m=1}^{n}[t_m(OM) - t_m(H)] + k_r, \quad OM < f \leq H \quad (1)$$

$$t_{n+1}(R) = t_{n+1}(OM) + k_r, \quad R < f \leq OM$$

where m=1, . . . , n are the n most recent flights past both the terminal area airspace handoff point (H), about 60 nautical mile radius, and the runway outer marker (OM), about 7 nautical mile radius, and $k_r$ is a site-defined constant, equal to the typical difference in flight time from the outer marker to landing. When an aircraft must go-around and attempt another landing, the landing time estimate is initially reset to a locally-defined constant $k_m$ (for instance, $k_m$=10 min. in Atlanta), as defined by Equation (2):

$$t_{n+1}(R) = k_m, \quad OM < f \quad (2)$$

until the outer marker is reached, then is recalculated as in Equation (1).

Given the lack of airfield ground tracking data, estimated taxi times use an averaging approach, dropping the highest and lowest values over the most-recently-concluded twelve taxiing aircraft. Let the taxi duration for a given flight f be:

$$\Delta t_m = (t_t - t_o) \quad (3)$$

where $t_t$ is the taxi termination time (gate arrival or takeoff) and $t_o$ is the taxi start time (landing or pushback) for a given flight. At any given time t, the estimated taxi time (calculated separately for arrivals and departures) is defined by Equation (4):

$$\Delta t_{p+1} = \frac{1}{p-2}\left[\left(\sum_{m=1}^{p}\Delta t_m\right) - \left(\max_{m=1,\ldots,p}(\Delta t_m) + \min_{m=1,\ldots,p}(\Delta t_m)\right)\right] \quad (4)$$

where 1, . . . , p are the most recently concluded taxiing flights. A value of p=12 is typically used by the traffic adviser.

However, during periods of light activity (i.e., between arrival/departure "banks" and late at night) the most recently-concluded taxi times may include some flights from hours before. In these cases, when taxi times occurred more than 15 minutes in the past, a (site-defined) minimum taxi time constant $k_t$ is used instead in calculating (4):

$$\Delta t_m = \begin{cases} (t_t - t_0), & \text{if } |t_{p+1} - t_t| < 15 \text{ min} \\ k_t, & \text{otherwise} \end{cases} \quad (5)$$

where $k_t$ is the site-defined minimum gate-to-runway taxi time.

Client Interface Subsystem 110 (FIG. 7)

The Client Interface Subsystem (CIS) 110 delivers flight status data to clients 117 in the form of display screens and a data stream. Clients 117 may choose in which form to receive data from the traffic adviser 100. Clients 117 wishing to receive display screens provide a node connection to the traffic adviser 100 on a local area network or a dial-in modem. Clients 117 wishing to receive a data stream can receive the data in the form of network TCP/IP messages or over a dial-up serial line.

The CIS 110 also receives input data from clients 117 in the form of display requests and flight status updates. The display requests select the information to be displayed on a particular client screen and apply only to that screen. The flight status updates allow controllers to enter information into the traffic adviser 100 concerning individual flights (pushback, gate arrival) and the current airport configuration (departure split, landing direction, etc.)

The screen displays are implemented by three exemplary programs: ci_data 701, ci_user 702, and ci_exec 703. The data stream output is implemented by two programs: ci_srvr 704, and ci_clnt 705. Client input is received as display events by the ci_user program 702. The ci_data program 701 fetches flight status data from the database 105 and distributes the data to the screen clients (clients' displays or terminals).

The function of the ci_data program 701 is to provide the screen clients with the current flight information. Each screen client connects to the ci_data program 701 via a known TCP/IP protocol port. The ci_data program 701 synchronously reads flight data from the databases 105 and passes the data without interpretation to all connected client programs. The ci_data program 701 detects when a client connects or disconnects and starts or stops sending the data to the client as appropriate. Inputs to the ci_data program 701 are data from the database 105, command line options and environment variables.

Output data includes the flight status data sent to the client ci_user programs 702 over the socket connections and error messages sent to the operator terminal.

The data processing includes calling an information subsystem (104) routine that returns 251-byte messages containing flight status and configuration data and sending each message to all connected clients 117. Split and landing direction messages are saved in a buffer for newly-connected clients 117, as these messages are only received when they change. After each complete set of messages has been read, the information subsystem routine will block execution for 20 seconds until the next update period, after which a complete set of data will be sent again.

After each data message has been read, the program checks if any connection requests have arrived from a new client. If a new client is trying to connect, the new client information is recorded into an array and the saved split and landing direction data is sent to the client 117.

The ci_user program 702 provides a graphical user interface to the traffic adviser 100 system. The function of the ci_user program 702 is to display flight data on a screen, update the data continuously as updates are received from the database 105, and accept commands from clients 117 to change the display format and to enter flight status data into the traffic adviser 100.

The ci_user program 702 generates different types of screens with different format, content and functionality depending on the type of user. There are several different types of clients 117: FAA tower controllers 140, airline ramp controllers 141, airlines 142, airport operators 143 and other FAA users or remote users 144. The type of screen generated is specified by a command line argument and is not under the control of the user.

The flight data comes from the ci_data program 701 via a TCP socket connection. The ci_user program 702 also maintains a direct single connection with the database 105 to perform multiple functions. The flight data displayed by the ci_user program 702 is filtered based on the configuration.

Flight status data is received from the ci_data program 701 via a socket. The data includes 251-byte messages containing ASCII text data. The messages include comma-separated fields containing data about departure and arrival flights, airport configuration, and summary data.

Detailed flight information for a client inquiry is fetched directly from the database 105 using a database query for the specific flight.

Client inputs are received as display events when a user touches or clicks on one of the active regions on a display. Each active region on a display is associated with a routine that is called when that region is activated. The routine can then fetch data about the event, if necessary, and enter the data into the traffic adviser 100. All input is done by touches or mouse clicks, as no keyboard input is required to interface with the clients' display monitors. Only FAA tower controllers are allowed to enter departure split and landing direction information.

Outputs of the ci_user program 702 include display commands to the clients' system and user inputs entered into the database 105 for processing.

After the displays have been created and the initial display drawn on the screen, the ci_user program 702 enters an event loop handler, which responds to clients input events or inputs from the ci_data program 701. From then until termination, the ci_user program 702 responds to events, which may be of several types: user-entered actions, system signals, and external inputs. User-entered actions can be touch or click events or keyboard entries. Each such event has an associated callback routine that is invoked when the event occurs, and which then acts on the event.

User events are the result of a user touching or clicking on an active region on a display. The active regions include buttons drawn on the screen, numbers, and items in a list. There are buttons to switch from one screen to another and to draw an overlaying window (pop-up). Pop-up windows are used for: 1) displaying lists of aircraft, 2) displaying graphs, 3) defining a departure split, 4) displaying detailed information about a specific flight, and 5) confirming actions such as exiting the ci_user program 702.

The ci_exec program 703 creates a single instance of the ci_user program 702 and monitors it to ensure that it remains active. The ci_exec program 703 starts the ci_user program 702 and restarts it if needed up to a certain number of times. For FAA tower controller clients 140, the ci_exec program 703 will restart the ci user program 702 up to 9 times before terminating. Ramp towers 141, airlines 142, and airport operators 143 can terminate their ci_user programs 702 and are therefore not restarted automatically by ci_exec program 703.

The ci_srvr program 704 provides traffic adviser status and schedule data to clients 117 in the form of a data stream. The function of the ci_srvr program 704 is to provide traffic adviser data concerning the status of flights to clients 117.

The data is provided as messages over a network socket for clients 117 logged in to the traffic adviser 100. Clients 117 connect to the traffic adviser 100 from a remote host over the network using a predefined socket number. Clients 117 must have a valid user account on the traffic adviser 100 to access the data.

Data may also be provided to a client 117 over a serial line by using a combination of the ci_srvr program 704 and ci_clnt program 705. A client may log in to the traffic adviser 100 and run the ci_cint program 705. The ci_clnt program 705 connects to the ci_srvr program 704. The ci_clnt program 705 then writes any message received from ci_srvr program 704 to the serial line, after appending check characters for error detection by the client 117.

Not all data is provided to all users 117. Airline users 142 will be sent status data only on those flights that they are allowed to see. However, some users, such as the airport operators 143, will be provided with all of the messages.

A connection to the database 105 is established so that flight status data may be selectively accessed.

Messages are issued by the ci_srvr program 704 once per minute. When the ci_srvr program 704 begins execution, the current time is fetched and rounded up to the next minute for the next update time. Additional update times at 5 min., 15 min., 1 hour, and 4 hours are calculated by rounding up to the next even interval.

The ci_srvr program 704 then enters an indefinite loop of waiting for client connections and transmitting messages to connected clients 117 at specific intervals. If a connection attempt is detected, the client 117 is added to a list of authorized connections. Newly-connected clients will receive a time message containing the current clock time on the traffic adviser 100 and an airport configuration message containing the current landing direction and departure split.

At each update interval, the program queries the database 105 looking for events that have just occurred. At each one-minute update, a time message with the current time is sent to all connected clients 117. This indicates that the traffic adviser 100 is working and allows the clients 117 to synchronize with the traffic adviser 100, if necessary. The airport configuration is checked, and if it has changed since the last update, the new configuration is sent to all clients.

At each one-minute interval, messages are sent for each flight estimated to arrive or depart in the next 10 minutes. For arrivals, the predicted touchdown time is used for the arrival time. For departures, the predicted pushback time is used. At each 5-minute interval, this period is expanded to give the flights predicted to arrive or depart in the next 30 minutes.

The ci_clnt program 705 provides traffic adviser status and schedule data to clients 117 via a serial line. The ci_clnt program 705 provides traffic adviser 100 data over a serial line if a client 117 connects to the traffic adviser 100 via dial-up modem. The messages may also be provided as output on a screen if a client 117 is already logged into the traffic adviser 100. The messages are primarily ASCII text, with control characters delineating the start and end of each message. A cyclic redundance checksum is appended to each message for error detection over unreliable serial lines.

A connection to the ci_srvr program 704 is established. The ci_clnt program 705 then enters the main execution loop of reading messages from the ci_srvr program 704, adding a checksum, and writing the messages to the serial line.

EXAMPLE 1

A specific embodiment of the present invention, called the Surface Movement Advisor (SMA), was implemented and tested at the Atlanta, (Ga.) Hartsfield International Airport. An Oct. 14, 1997, report, "Surface Movement Advisor (SMA) Benefit Analysis," was written by William Rada for the FAA. This report, which describes this implementation and its very favorable results, is partially reproduced herein.

Surface Movement Advisor (SMA) Benefit Analysis 1.0 Executive Summary

This report presents an analysis of the benefits of the Surface Movement Advisor (SMA) prototype tested at Hartsfield Atlanta International Airport (ATL). The objective of the analysis is to measure the value of using SMA to help manage aircraft surface movement by sharing situation information among airlines, airport operators and air traffic controllers. SMA designers expect its use to reduce taxi-out delays caused by traffic congestion.

Benefits are calculated based on reduced taxi-out times during periods when SMA was fully operational at ATL in the Air Traffic Control Tower (ATCT), at the Delta Air Lines and city ramp towers, and in the Delta dispatch center and operations control center. These times are compared to others drawn from periods where SMA was operational in all but the ATCT locations, and finally to times drawn from a period when SMA was completely shut down. The time savings are translated into dollar savings using standard Direct Aircraft Operating Costs (ADOC) and Passenger Value of Time (PVT) costs established by the FAA's Office of Policy and Plans. Taxi-out time is defined as the time from push back at the gate to wheels-off during take-off.

The results show that the use of SMA is generating user benefits in the form of cost savings due to reduced taxi-out times at ATL. Taxi time reductions average approximately 1 minute per aircraft, while user cost savings at ATL are projected to range from $16 to 21 million in 1997 (normalized to a full year). Taxi-out savings vary at ATL with time of day and day of the week; in general, a greater average saving per aircraft is achieved during periods of higher traffic volume.

The study concludes that airports with similar traffic loads and runway configurations to those at ATL may obtain comparable savings through the use of SMA.

2.0 Background

As traffic growth puts increasing demands on the National Airspace System (NAS), a heightened emphasis is being placed on using available resources with the greatest efficiency. This efficiency becomes of particular importance at major hub airports, where delays due to traffic congestion often become the limiting factor in the performance of the entire NAS.

The Surface Movement Advisor concept was developed to help alleviate taxi delays at major airports where complex taxi patterns approach "grid lock" during peak traffic periods. SMA is a tool that supports departure-balancing and data-exchange programs between the FAA, airport operators and commercial airlines. This tool gives tower supervisors the ability to balance runway queues to make for more efficient traffic flows.

In addition, SMA provides information on the impact that arriving and departing aircraft will have on ramps, gates, taxiways and runways. By sharing tactical aircraft information among appropriate FAA, airport and airline functional organizations, better flow plans can be developed and taxi times can be reduced.

SMA is the result of a new Air Traffic Management initiative conceived and developed by the FAA, NASA and MITRE Corporation's Center for Advanced Aviation System Development (CAASD). This unprecedented proposal to share information in real time among various ATC and airline functions was tested at Atlanta's Hartsfield Airport in early 1997. A local area network (LAN) consisting of two dozen computer display screens was placed in various facilities, including the airlines, ATCT, ramp tower, Air Route Traffic Control Center (ARTCC) and Terminal Radar Approach Control (TRACON). Touch-screen displays provide quick and easy access to data. For example, ATC tower screens can display average "push-to-off" times of each aircraft and a list of aircraft currently pushing back from gates. In ramp towers SMA lists the aircraft scheduled to depart and departure rates for various runways, helping controllers identify improved taxi plans that better balance the load across available runways.

The Hartsfield Atlanta International Airport is publicly owned. It has four parallel East-West runways; typically, two are used for arrivals and two for departures. Departing north and southbound aircraft are automatically assigned to the north and south departure runways, respectively. East and westbound aircraft can be assigned to either runway. ATL handles approximately 750,000 aircraft operations per year.

3.0 Ground Rules and Assumptions

Observations cover four to five weeks of operations for each alternative. Results are also generated for weekday vs. weekend, and daytime vs. nighttime traffic. Data used reflect the new aircraft wake turbulence categories implemented by the FAA in August, 1996.

Taxi-out times are assumed to be normally distributed. Benefit calculations are based on commercial aircraft departures between 5:00 a.m. and midnight. Benefits are limited to savings in commercial airline aircraft direct operating costs and in passenger time due to reduction in taxi-out times. Standard FAA/APO values as updated in June, 1996, are used to convert time to dollar savings. FAA/APO Terminal Area Forecast (TAF) growth estimates for ATL are used to project benefits for a 10-year period of usage beginning in 1997. This growth is not constrained by existing runway capacity. All benefits are calculated in constant 1997 dollars. A 7 percent discount rate is used in the present-value analysis, in accordance with OMB circular A-94 as updated in February, 1997. No FAA staff reduction savings are considered.

4.0 Alternatives Assessed

This analysis evaluates the impact of using SMA at Hartsfield International in two operating modes: at the ATCT, ramp towers, and Delta Air Lines dispatch and operations centers; and at all those locations except the ATCT.

Baseline

Taxi-out times are computed using departure data from ATL during a period when SMA was not in use (Apr. 20 to May 16, 1997). Average taxi-out times and standard deviations are calculated.

Alternative 1: SMA in ATCT, ramp towers, and Delta control centers

Taxi-out times are computed using departure data from ATL when SMA was used the ATCT, ramp towers, and Delta Air Lines dispatch and operations centers. These data were collected during the period from Feb. 19to Mar. 22, 1997. Average taxi-out times and standard deviations are calculated.

Alternative 2: SMA in all locations except ATCT

Taxi-out times are computed using departure data from ATL when SMA was used in the ramp towers and Delta control centers only. These data were collected during the period from Mar. 23 to Apr. 19, 1997. Average taxi-out times and standard deviations are calculated.

5.0 Data Sources and Methods

This section is divided in two subsections: subsection 5.1 describes the data used in this study; subsection 5.2 gives a detailed description of the methodology used to quantify benefits.

5.1 Description of the Data

Taxi-out data for ATL were collected for the months of February, March, April and May from Airline Service Quality Performance (ASQP) data. The sample includes only commercial aircraft equipped with Aircraft Communications Addressing and Reporting System (ACARS) equipment. In 1996, commercial operations were 77 percent of annual aircraft operations at ATL (FAA/ADO Terminal Area Forecast (TAF) airport operations data).

The data for Alternatives 1 were gathered over periods of time when SMA was operational at the ATCT, ramp towers, and Delta control centers. The data for Alternative 2 reflects a period during which SMA was operational at all locations in Alternative 1 except the ATCT. The baseline data was collected when SMA was not in use. Only operation between 5:00 a.m. and midnight was considered for the analysis.

Baseline data available from periods prior to the installation and operation of SMA at ATL did not reflect the August 1996 re-definition of aircraft wake turbulence classifications. Therefore, the baseline (i.e., non-SMA taxi times) for this analysis was established by shutting down SMA after it had been in use for several months.

The periods of analysis were chosen to allow valid comparisons across the alternatives analyzed. In order to test whether weather conditions in Atlanta were similar over the period of analysis, records of daily precipitation, mean visibility, and mean wind speed were evaluated (these data are presented graphically in the appendix). No significant trends or biases were apparent. If a small weather bias did exist, it would be expected to increase taxi times when SMA data was collected (February–April) over the baseline period (April–May). This would cause the results of this analysis to err in the direction of understating SMA benefits.

The average number of daily taxi-out operations per alternative, with the corresponding standard deviation, is as follows:

Alternative
Average Daily Taxi-Out Operations
Standard Deviation
Baseline
650.29
30.47
Alternative 1. SMA at all locations
650.75
15.97
Alternative 2. SMA at all locations except ATCT
637.04
17.10

5.2Methodology

The data were sorted by wheels-off time in half-hour intervals between 5:00 a.m. and midnight. Taxi-out times were evaluated to obtain averages for the previously specified periods and alternatives.

Average taxi-out times with their corresponding standard deviations were calculated for each alternative and compared with the baseline scenario. The data were further analyzed to evaluated SMA impact on weekday vs. weekend, and daytime vs. nighttime traffic. Weekend was defined to include aircraft operations between 5:00AM and midnight Saturday and Sunday. Daytime traffic was defined using 1997 civil twilight times for the city of Atlanta.

Differences in taxi time were converted to user savings using standard FAA/APO economic values (current as of June, 1997). Both airline and passenger savings due to reduced taxi times were computed. The APO values equate to ADOC savings of $27.84 per minute, and passenger savings of $44.50 per minute per aircraft (using a 100 passengers per aircraft load factor).

A 10-year stream of benefits for the periods between 1997 and 2006 was calculated based on projected operations growth rates for ATL taken from the FAA's Terminal Area Forecast. Savings were extrapolated for the out-years, assuming a constant average taxi time savings per aircraft for each alternative.

6.0 Findings

It was determined that a statistically significant change in taxi-out times occurred when SMA was operating. Testing the hypothesis that, on average, taxi-out times decreased when SMA was in use confirmed that hypothesis with a p-value less than 0.0001. In other words, the probability that the observed taxi times would have occurred had the hypothesis actually been false was less than 0.0001.

By comparing average taxi-out times under Alternatives 1 and 2 with the baseline, it was determined that SMA saves an average of 1.09 minutes per aircraft when used in all locations, and 1.00 minutes when used everywhere but the ATCT. To provide a more useful estimate of taxi-out savings, a 95 percent confidence interval for the difference between the true population means (i.e., for the average taxi time savings per aircraft) was calculated, comparing each alternative to the baseline.

Expected ten-year total benefits for Alternative 1 are $203.4M and for Alternative 2 are $187.7M, in constant 1997 dollars.

During this study a range of potential SMA benefits were identified that were not quantified. These include the following:

FAA Benefits:
Improves queue management
Aids tower supervisor in airfield management
Improves productivity by reducing communication time between ATCT and ramp controllers, and between ATCT controllers and pilots
Provides information to ground controllers that helps during times of reduced visibility Airline Benefits
Increases airline productivity (faster aircraft turn around time, more efficient crew management, better gate utilization and improved passenger throughput)

Airport Benefits
Supports 'what-if' analyses for planning airfield maintenance operations, etc. Improves management of federal immigration and agriculture services Provides information to ramp managers that helps during times of reduced visibility

CONCLUSION

It was found that statistically significant reductions in taxi-out times occurred at ATL during period when SMA was in use. Based on the data collected for this study, SMA appears to reduce taxi-out delays by an average of one minute or more per aircraft at ATL. This time savings can be translated into direct commercial airline and passenger cost savings.

Similar savings are possible at other airports with traffic loads similar to those at ATL. Preliminary indications are that savings per aircraft may be greater at airports with higher traffic volumes.

What is claimed is:

1. A real-time surface traffic management, knowledge-based, expert advisor system for optimizing airport operational efficiency by acquiring, fusing, interpreting, mining and displaying real-time predictive and processed data for surface traffic management or training simulations comprising:

an intelligent server;
a plurality of input sources connected to said intelligent server via communication links; and,
a plurality of destination sources connected to said intelligent server via said communication links, for allowing users to access said real-time predictive and processed data;
said intelligent server comprising:
  a) an input management subsystem, comprised of autonomous computer programs, which collects heterogeneous, incompatible data from multiple sources, including user or instructor provided data, manages data sources, initiates actions in response to events, and communicates and negotiates through said expert advisor system, without direct human control,
  b) an information subsystem which is a receiver of data from said input management subsystem and said user or instructor, a data fuser and integrator of said data, and an information router to the subsystems of said expert advisor system,
  c) a prediction subsystem, which is an information receiver from said information subsystem, comprising data fusion rules for providing, accuracy assessments, future surface event predictions, and provision of said predictions back to said information subsystem,
  d) a client interface subsystem which is a provider of displayed data to the destination sources, and
  e) an autonomous executive subsystem which is a start-up and control system for said intelligent server, an error recovery and message system, and a system health monitor.

2. The expert advisor system of claim 1, wherein said input management subsystem further comprises one or more of a data sorter, a data identifier, a data corrector, and a data acquisition and search daemon.

3. The data acquisition and search daemon of claim 2, wherein said data acquisition and search daemon is an independent program that is attached to a value or structure in the airport database, and said data acquisition and search daemon is a real-time daemon "invoked" or triggered automatically when said value or structure is read or changed.

4. The expert advisor system of claim 1, wherein said input management subsystem is wholly or partially comprised of data agents.

5. The data agents of claim 4, wherein said data agents are autonomous computer programs which manage data sources, initiate actions in response to events, and communicate and negotiate with other data agents within said expert advisor system without direct human control.

6. The expert advisor system of claim 1, wherein said information subsystem is a data mining system, comprised of independent programs which run periodically to search all of said information subsystem for trends or discernable patterns to be routed for diagnostics, predictions and operations analysis to the appropriate said expert advisor system subsystems.

7. The data mining system of claim 6, wherein said data mining consists of the application of commonly known knowledge-based reasoning and statistical computational techniques to find the "effective" or "valuable" information in the traffic data by:

(a) constructing a model (or a set of models) for explaining the variation of the input data,
(b) preprocessing (or transforming) the original data in order to make consistency between input data and the model, and,
(c) identification of the model based on observed (input) data.

8. The input management subsystem of claim 1, wherein historical data generated by said information subsystem or said prediction subsystem is routed back to said input management subsystem.

* * * * *